United States Patent [19]
Tsuji et al.

[11] Patent Number: 5,389,986
[45] Date of Patent: Feb. 14, 1995

[54] REMOTE CONTROLLED CAMERA SYSTEM

[75] Inventors: Sadafusa Tsuji, Tondabayashi; Yoshito Tanaka, Sakai; Yoshihiro Tanaka, Osaka; Hiroyuki Okada, Sakai, all of Japan

[73] Assignee: Minolta Camera Kabushiki Kaisha, Osaka, Japan

[21] Appl. No.: 186,499

[22] Filed: Jan. 21, 1994

Related U.S. Application Data

[63] Continuation of Ser. No. 855,716, Mar. 20, 1992, abandoned.

[30] Foreign Application Priority Data

Mar. 26, 1991 [JP] Japan ............................ 3-087443
Apr. 1, 1991 [JP] Japan ............................ 3-096374

[51] Int. Cl.⁶ .................................... G03B 29/00
[52] U.S. Cl. ............................... 354/81; 354/266
[58] Field of Search ............. 354/81, 266, 267.1, 354/268, 269

[56] References Cited

U.S. PATENT DOCUMENTS 5,066,970 11/1991 Kakita et al. ................... 354/81 X

FOREIGN PATENT DOCUMENTS 2-269330 11/1990 Japan .
2-280130 11/1990 Japan .

*Primary Examiner*—Howard B. Blankenship
*Attorney, Agent, or Firm*—Willian Brinks Hofer Gilson & Lione

[57] ABSTRACT

A camera system on which a remote control device enables photographing with a camera body directed to a user of the remote control device, is controlled by a program of a microcomputer for controlling provided in the camera body. In this program, while the lens direction of the camera body is being shifted by the remote control device, a release signal sent from the remote control device is disregarded. As a result, even if the user pushes a release button by mistake to transmit a release signal, the microcomputer does not accept a remote control release signal while the lens is moving by a remote control drive signal, thereby preventing exposure.

21 Claims, 25 Drawing Sheets

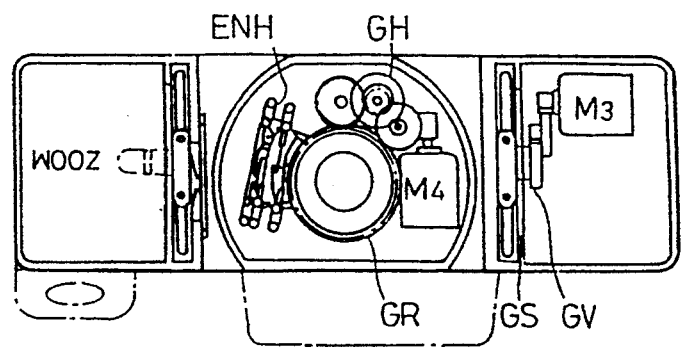
FIG. 3(B)
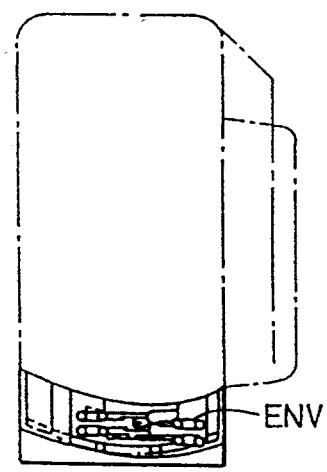
FIG. 3(C)
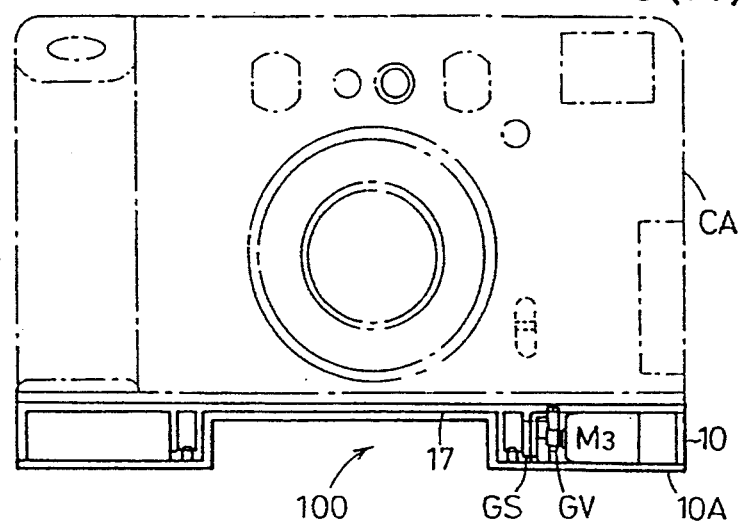
FIG. 3(A)
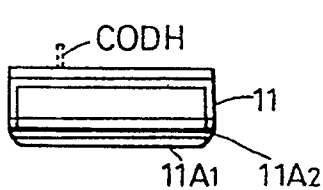
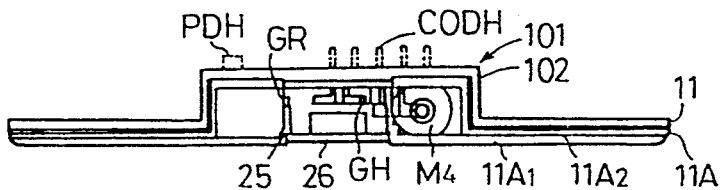

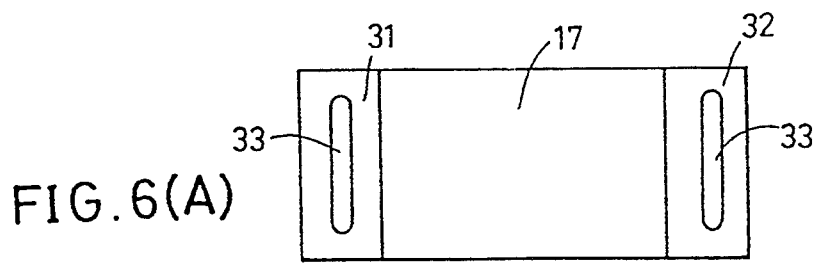
FIG.6(A)
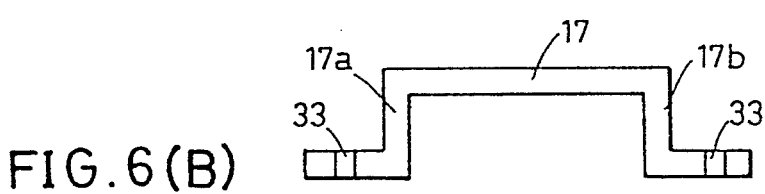
FIG.6(B)
FIG.6(C)
FIG.6(D)
FIG.6(E)
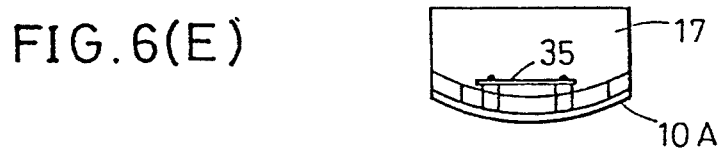

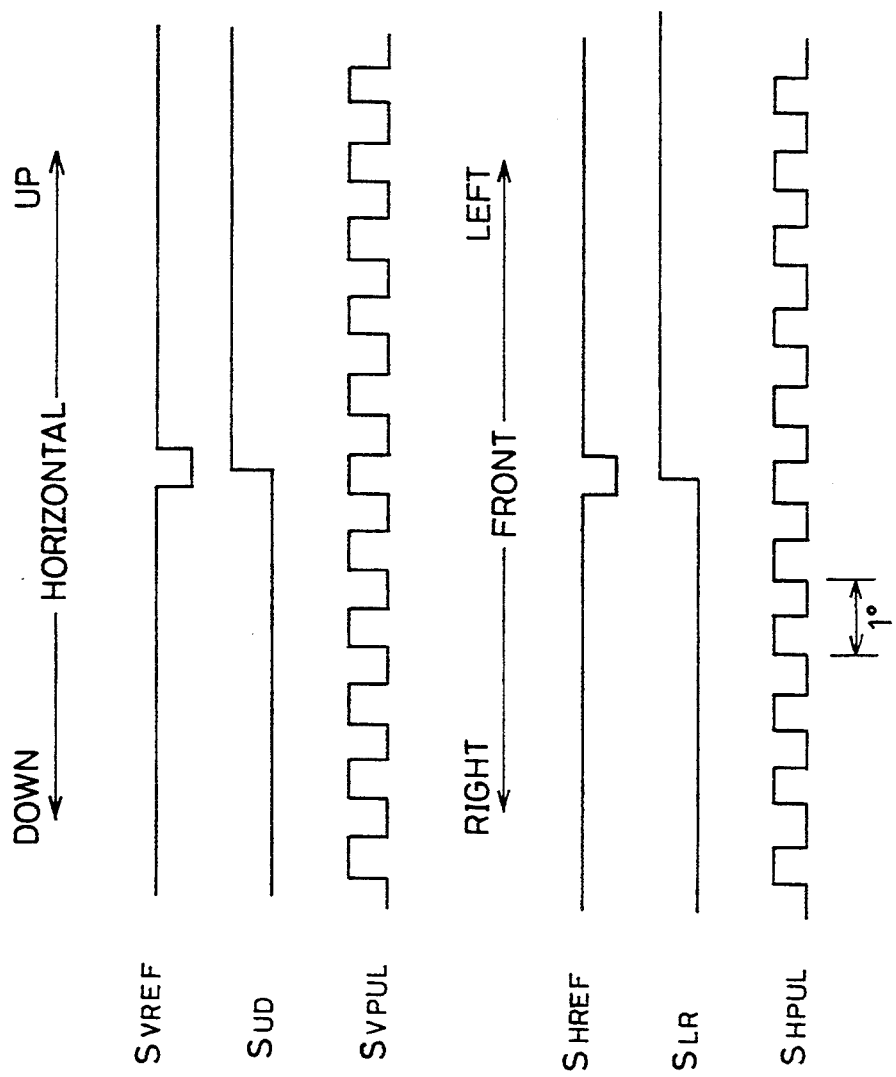

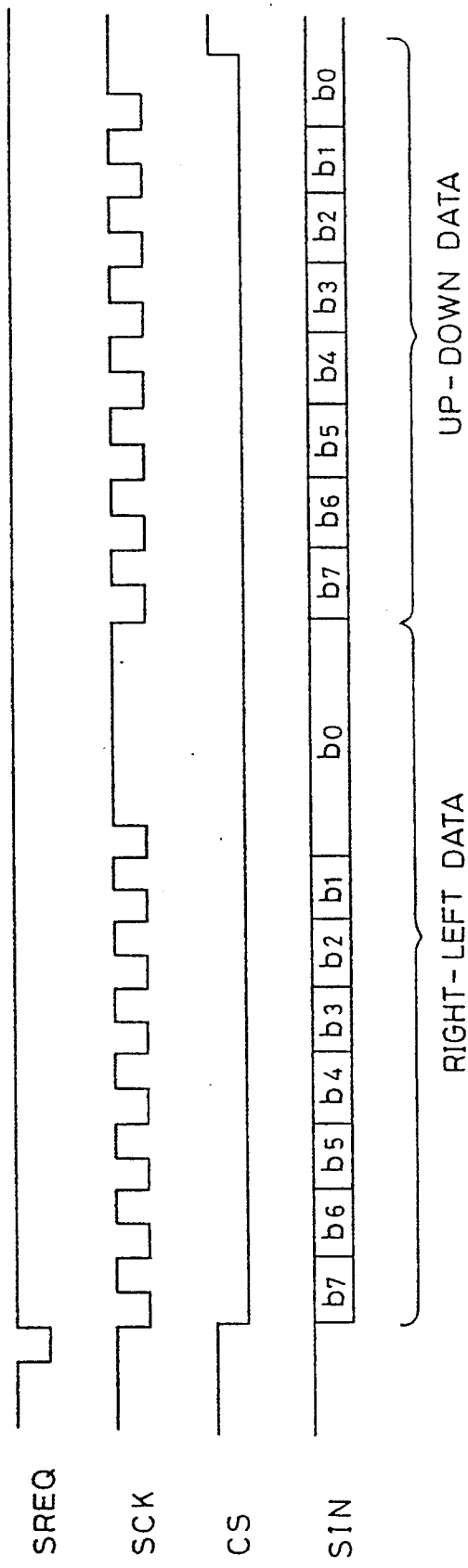
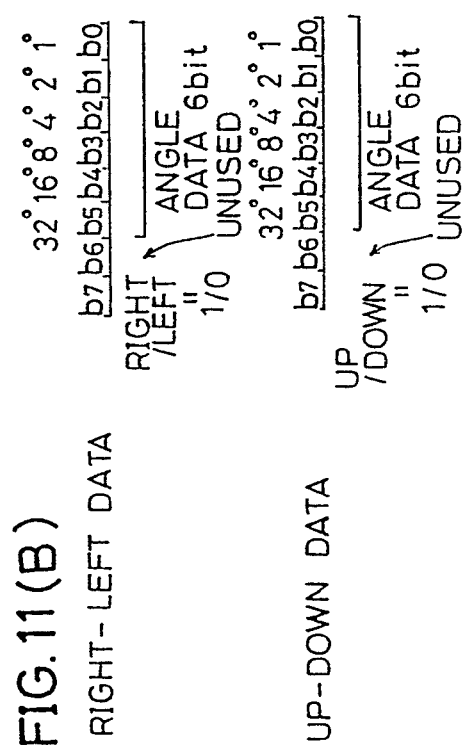

DRIVE UNIT RESETTING ROUTINE

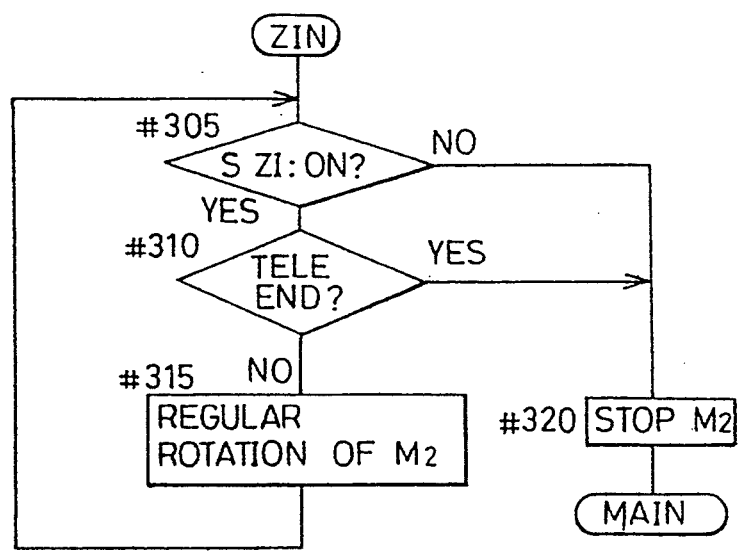
ZOOM-IN ROUTINE FIG.14(A)
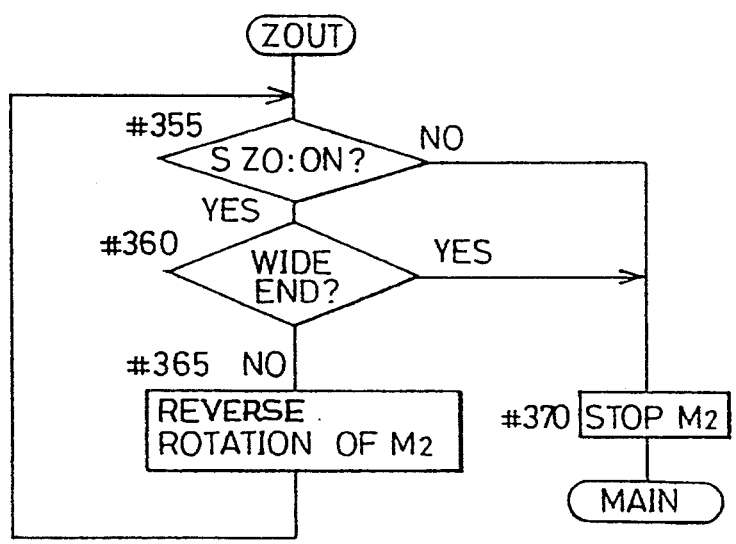
ZOOM-OUT ROUTINE FIG.14(B)

S1 ON / S2 ON ROUTINE

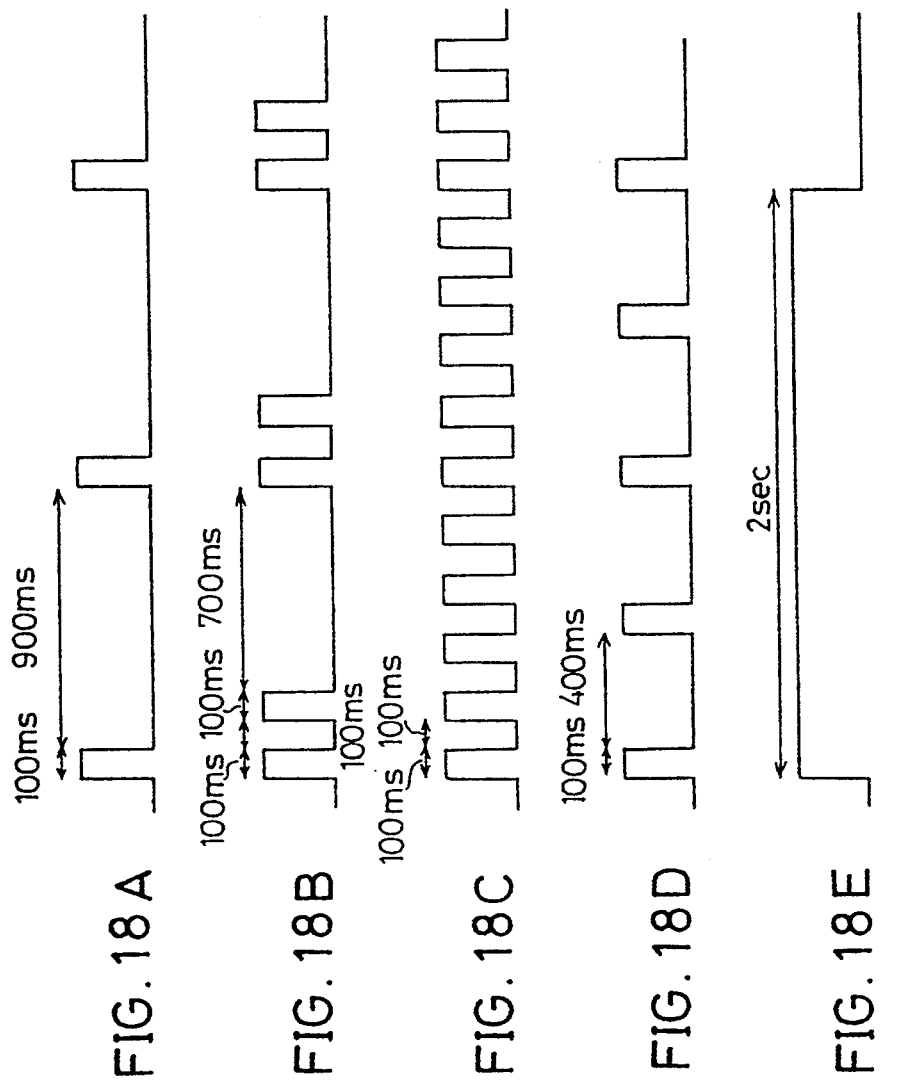

S1 ON / S2 ON ROUTINE

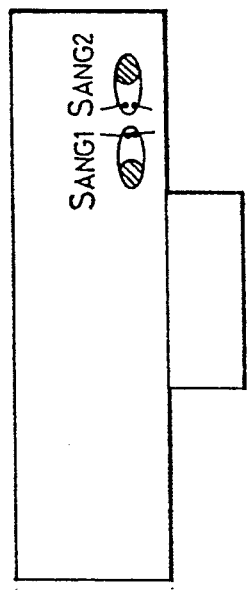
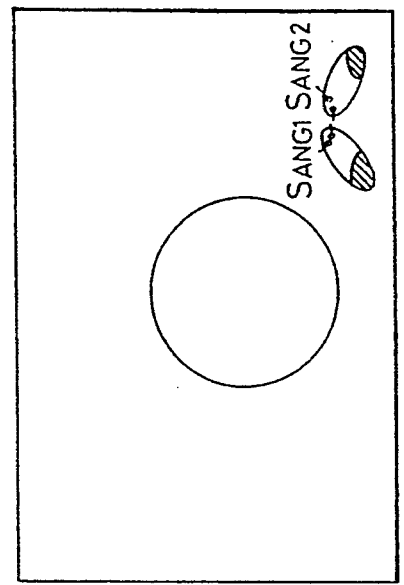
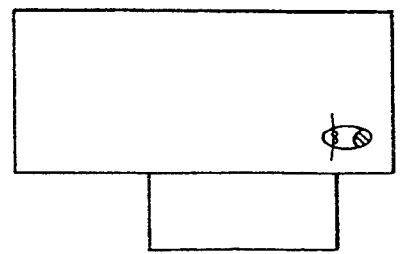

REMOTE CONTROLLED CAMERA SYSTEM

This application is a continuation of application Ser. No. 07/855,716, filed Mar. 20, 1992, now abandoned.

BACKGROUND OF THE INVENTION

1. Field of the Invention

The present invention relates to cameras equipped with remote control devices. More particularly, the present invention relates to a camera allowing an optical axis of a taking lens to be rotated in response to a signal emitted from a remote control device.

2. Description of the Related Art

A camera operated by a remote control device is disclosed in Japanese Patent Laying-Open Application No. 60-139998, for example. According to this application, the camera operated by a remote control device is provided on a pan head which receives an optical signal from the remote control device to calculate a gap between a direction of an optical axis of the camera and a direction of the remote control device, and which moves the optical axis by motor drive so as to fill the gap. Therefore, the optical axis of the camera automatically faces toward the remote control device. The camera is movable not only in right and left directions but also in upward and downward directions of an optical axis of an optical signal from the remote control device. Furthermore, it is also possible to output a signal indicating to an object that the camera and the remote control device have a predetermined locational relation.

A conventional remote controlled camera structured as described above enables photographing, irrespective of a relation between the optical axis of the camera and the remote control device before the photographing.

Such a camera body as having its form changing with a drive of the optical axis cannot be put in a case or the like after remote-controlled photographing is finished unless the optical axis of the camera is set to an initial position. In addition, when the camera mode is switched from remote-controlled photographing mode to normal photographing mode, the camera body placed twistedly with respect to the drive unit makes a normal photographing difficult. The above described both cases require an operation for resetting the camera body to the initial state. Thus, another remote-controlled operation in such a direction that the camera body is driven to an initial position should be performed by an user after the remote-controlled photographing is finished.

In addition, the user operating a remote control device of the above-described camera has difficulty in finding a state of the camera body being driven by the remote control device because the user is away from the camera. The user therefore might operate a remote release button for performing a release operation before the camera body fully faces the user with the remote control device, that is, an object. As a result, there are cases where no desired photographs can be obtained.

SUMMARY OF THE INVENTION

An object of the present invention is to provide, for a camera whose optical axis of a taking lens can be rotatably driven in response to a signal from a remote control device, a remote-controlled camera system which requires no intentional initialization of a driver unit by an user and in which a camera body automatically initializes the drive unit in preferred timing.

Another object of the present invention is to provide, for a camera whose optical axis of a taking lens can be rotatably driven in response to a signal from a remote control device, a remote-controlled camera system which allows, after remote-controlled photographing is finished with the camera body facing to an object, the camera to be automatically reset to an initial state, and also allows continuous photographing to be performed in the same state of the camera.

Still further object of the present invention is to provide, for a camera whose optical axis of a taking lens can be rotatably driven in response to a signal from a remote control device, a remote controlled camera system on which a releasing operation is prohibited while the lens is driven by a remote-controlled operation.

In a remote controlled camera system according to the present invention, an optical axis of a lens is shifted up and down and rightward and leftward in response to a signal from a remote control device. In response to a switching between a remote control mode and a normal mode by the remote control device, the optical axis of the lens is reset to a predetermined direction. As a result, the direction of the lens optical axis with respect to a camera body is automatically initialized according to the mode.

In the remote controlled camera system according to another aspect of the present invention, a first signal from the remote control device activates rotation of the optical axis of the lens with respect to the camera body and a second signal activates an exposure operation. Even if the second signal is sent from the remote control device during the rotation of the optical axis by the first signal, no exposure is performed. As a result, a releasing operation is prohibited while the lens is being driven by the signal from the remote control device.

The remote controlled camera system on which the optical axis of the lens is shifted up and down and rightward and leftward in response to a signal from the remote control device according to still further aspect of the present invention, the optical axis of the lens is set to a predetermined direction after a lapse of a fixed time after the end of exposure. As a result, it is possible to take a photograph in the same state as of previous photographing in continuous photographing and the lens is automatically restored to an initial state if photographing is stopped.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A, 3B, and 3C is a view showing a drive unit of the camera.

FIG. 6A, 6B, 6C, 6D, and 6E is a view showing a vertical drive unit and a swing mechanism.

FIG. 10 is a signal waveform diagram of up-down and right and left direction information.

FIG. 11A and 11B is a signal waveform diagram of remote control drive information.

FIG. 14A and 14B is a flow chart of zoom control.

FIG. 18A, 18B, 18C, 18D, and 18E is a diagram showing a lighting pattern of a LED of the camera.

FIG. 23A, 23B, and 23C is a diagram showing an arrangement of an angle detection switch.

DESCRIPTION OF THE PREFERRED EMBODIMENTS

Figure 1A:
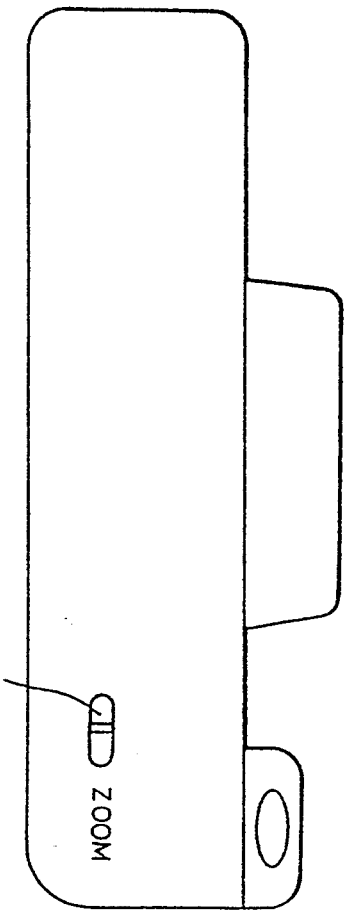
FIG. 1A, 1B, and 1C is an over view showing a camera body.
Figure 1B:
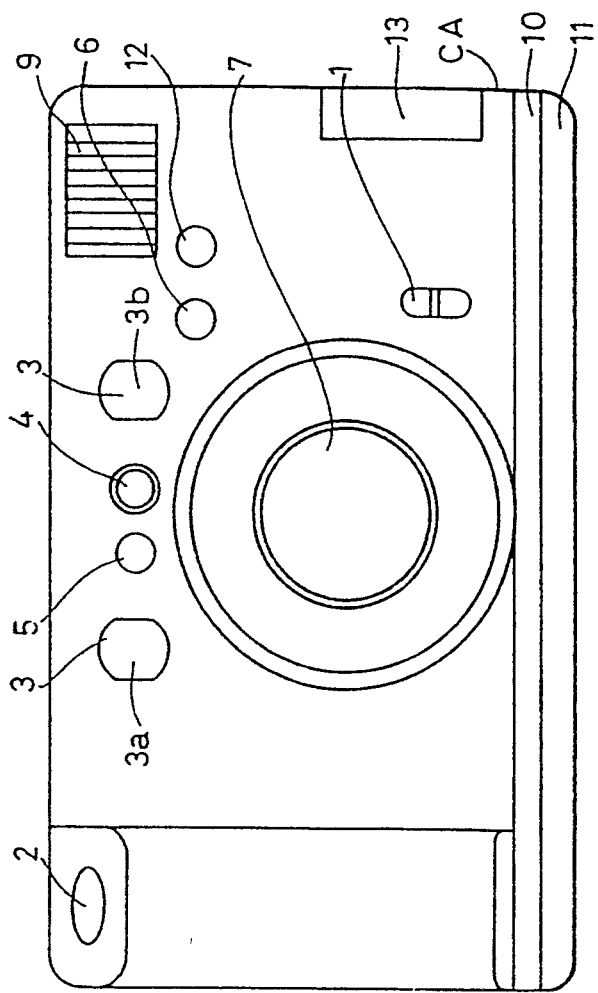
Figure 1C:
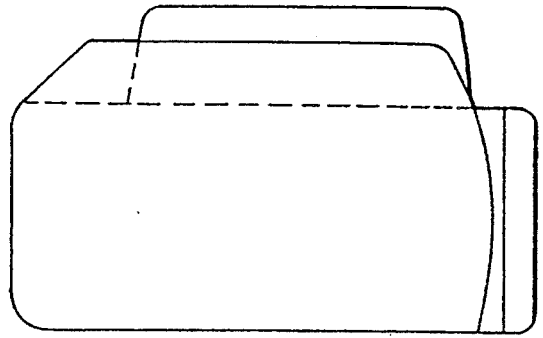

With reference to FIG. 1, operation of a camera body is allowed and inhibited by turning on and turning off a switch 1, respectively. Light measurement/distance measurement (focus detection) is carried out at a first stroke of a release button 2 and exposure is performed at a second stroke thereof. Distance measurement (hereinafter referred to as focus detection) is carried out through an AF (Auto Focus) window 3 with one window 3a for emitting infrared light for measuring distance and the other window 3b for receiving the infrared light reflected by and returned from an object. Light measurement is performed by receiving light reflected by the object through a photometry window 5. A photographer looks at the object through a finder. Infrared light from a remote control device is received through a light receiving window 6 for remote controlled photographing. A taking lens 7 is provided at the center of the camera body. Zooming is performed by operating a zoom lever 8 provided at the upper portion of a camera body CA. Moving the zoom lever 8 rightward in the figure activates a zoom-in operation and moving the same in the opposite direction activates a zoom-out operation. A flash generating unit 9 is provided at the upper end portion of the camera body CA. The camera system according to the present embodiment is provided with two drive units, a vertical drive unit 10 and a horizontal unit 11, for directing the optical axis of the camera toward the object in a remote-controlled operation. The vertical drive unit 10 shifts the optical axis of the camera toward a vertical direction, while the horizontal drive unit 11 shifts the optical axis of the camera toward a horizontal direction. An indicator light emitting diode (hereinafter referred to as indicator LED) 12 provided in proximity to the flash generating unit 9 has a function of informing an user of various information relating to remote-controlled photographing. Remote-controlled photographing is carried out by a remote control device 13 detachable from the camera body CA, detachment of which device from the camera body CA activates a remote-controlled photographing mode of the camera.

Figure 2A:
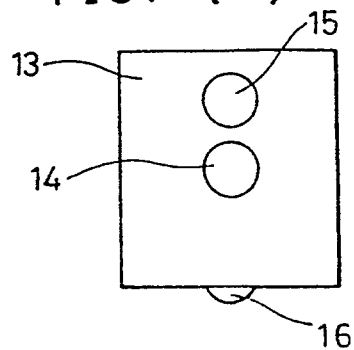
FIG. 2A, 2B, and 2C is an over view showing a remote control device.
Figure 2C:
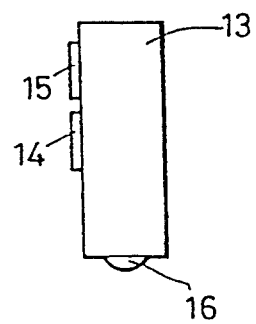
Figure 2B:
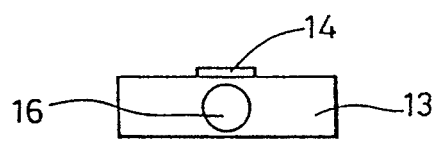

With reference to FIG. 2, the remote control device 13 includes a remote control releasing operation button 14 and a remote-control driving operation button 15 provided on the upper surface thereof and an infrared LED 16 for emitting infrared light provided on the front surface.

With reference to FIGS. 3(A) to 3(C) are a front sectional view, a plan view and a side view, respectively. The camera body is slidably supported by a vertical stand 10A. The lower frame of the camera body CA operates as a swing member 17.

The vertical drive unit 10 includes a vertical driving motor M3, a reduction gear array GV connected thereto and an encoder ENV for outputting a signal as will be described with reference to FIG. 10, all of which are fixed to the vertical stand 10A. The reduction gear array GV is connected to a swing gear GS of the swing member 17, whereby the camera body CA swings with respect to the vertical stand 10A in response to the rotation of the vertical driving motor M3, thereby swinging the optical axis of the taking lens 7 up and down.

FIG. 6 is a diagram showing the swing mechanism in detail. (A) is a plan view of the swing member 17, (B) is a front view of the same, (C) is a right side view, (D) is a right side view of the vertical stand 10A and (E) is a right side view of the combined swing member 17 and vertical stand 10A. The swing member 17 has elongated holes 33 at its right and left end portions 31 and 32, and through the elongated holes 33, pins 34 provided in the vertical stand 10A pass. A plate 35 is attached to the tips of the pins 34 which have passed through, thereby preventing 10A and 17 from falling off. Both lower edges of the swing member 17 and the vertical stand 10A are bow-shaped and the elongated holes 33 are also bow-shaped accordingly. Relative movement of the swing member 17 to the vertical stand 10A results in drawing a bow-shaped locus.

Figure 7A:
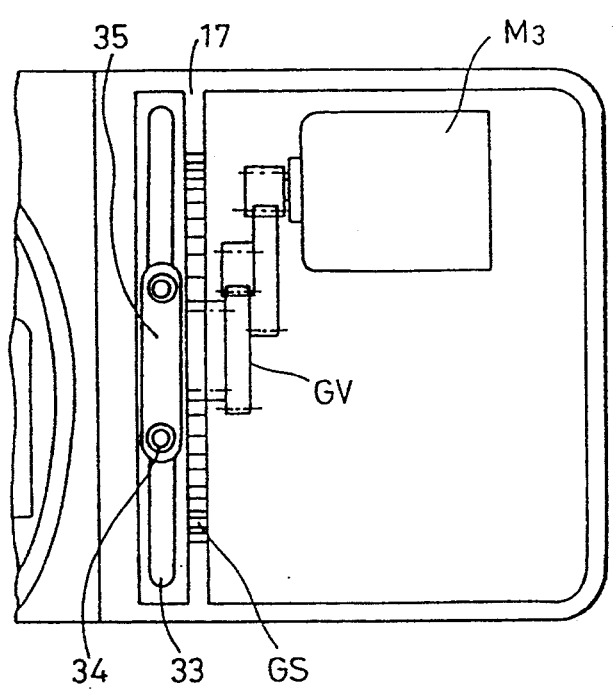
FIG. 7A, 7B, and 7C is an enlarged view of the vertical drive unit.
Figure 7B:
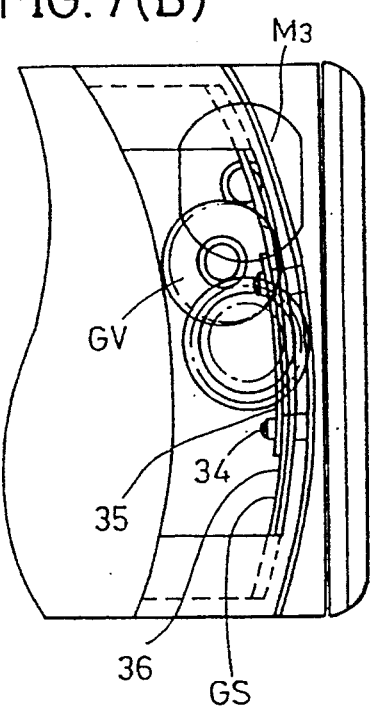
Figure 7C:
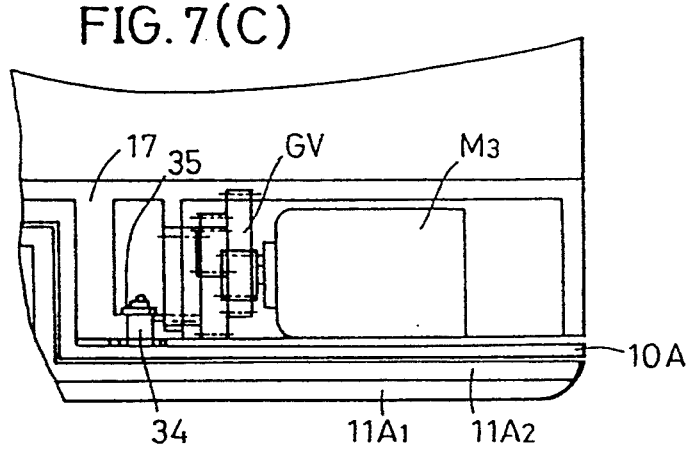

FIG. 7 is a view mainly showing the vertical drive unit 10, wherein FIG. (A) is a plan view, (B) is a sectional side view and (C) is a front view. Herein, the drive gear GS is provided under a right wall plate 17b of the swing member 17 to have a bow-shape. 36 in FIG. (B) represents a pitch circle of the drive gear GS.

Figure 8A:
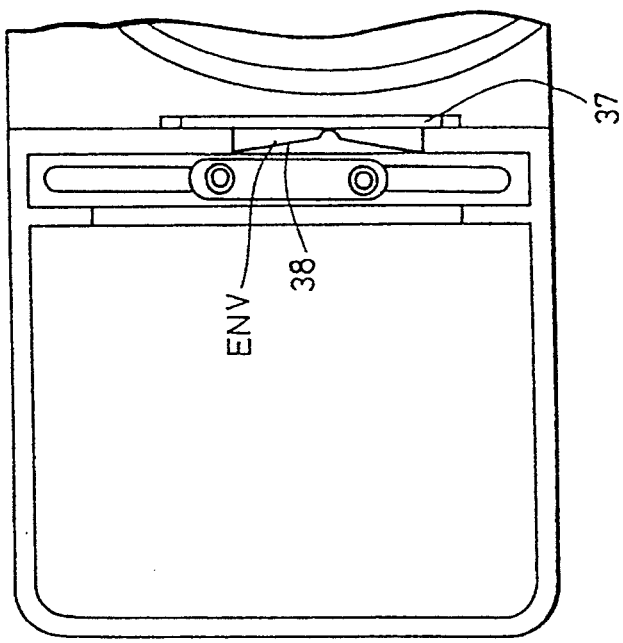
FIG. 8A and 8B is a view showing an encoder for position detection in the vertical drive unit.
Figure 8B:
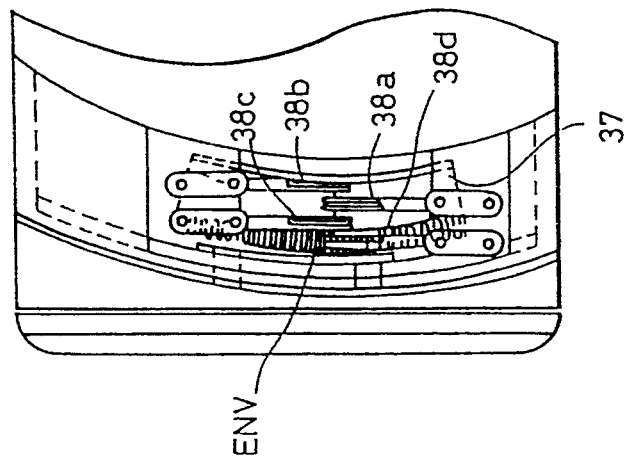

FIG. 8 shows the encoder ENV for detecting vertical position, wherein FIG. (A) is a sectional side view and (B) is a plan view. An encoder plate 37 is attached to the left wall of the vertical stand 10A, while an armature 38 is attached to an inner surface of a left wall plate 17a of the swing member 17. Four armatures 38a, 38b, 38c and 38d are provided corresponding to the respective patterns formed on the encoder plate 37, among which the armature 38b is used for grounding and the armatures 38a, 38c and 38d output SUD, SVREF and SVPUL shown in FIG. 10, respectively.

Again with reference to FIG. 3, the horizontal drive unit 11 is detachably provided to the camera body CA with the vertical drive unit 10 incorporated therewith in a manner as described above. The horizontal drive unit 11 is provided with a convex portion 101 fitting in a concave portion 100 formed at the vertical drive unit 10. A rotation member 102 of the horizontal drive unit 11 is provided with a connector pin CODH and an attachment sensing pin PDH. The connector pin CODH is connected to a connector COC provided at the lower portion of the camera body CA when the horizontal drive unit 11 is attached to the camera body while the pin PDH turns on the attachment sensing switch SDR in response to a drive piece of a sensing switch SDR (see FIG. 9).

The horizontal drive unit 11 includes a horizontal driving motor M4, a reduction gear array GH connected thereto and an encoder ENH for outputting a signal as will be described with reference to FIG. 10 (see FIG. 5). A horizontal stand 11A comprises a first horizontal stand 11A1 and a second horizontal stand 11A2 which come into contact with each other at the side portion and alienate from each other at the central portion, with the horizontal driving motor M4 placed on the first horizontal stand 11A1 and the reduction gear array GH provided on the second horizontal stand 11A2. The rotation member 102 rotates in a horizontal direction with respect to the horizontal stand 11A in response to the rotation of the horizontal driving motor M4.

Figure 4:
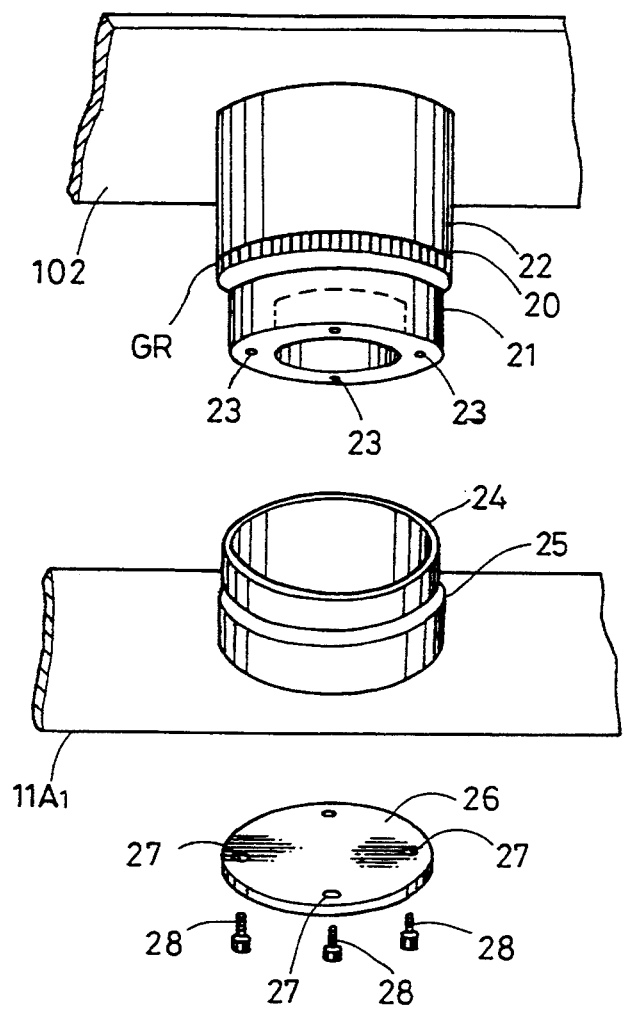
FIG. 4 is a partial perspective view of the drive unit.

As shown in FIG. 4, the central portion of the rotation member 102 is provided with a cylindrical portion 22 including a first cylindrical portion 20 projecting downward and a second cylindrical portion 21 continuous with the first cylindrical portion 20 and having a diameter a little smaller than that of the first cylindrical portion 20. A rotation GR engaging with the reduction gear array GH is provided at the lower circumference of the first cylindrical portion 20. Vis holes 23 are provided at the lower surface of the second cylindrical portion 21. The first horizontal stand unit 11A1 is provided with an upwardly projected cylindrical portion 24, and the second cylindrical portion 21 fits therein. A disk 26 having through holes 27 is inserted from above the first horizontal stand 11A1 into the cylindrical portion 24 until it reaches a stepped portion 25. At such position, vises 28 are driven into the vis holes 23 of the second cylindrical portion 21 through through holes 27 to rotatably couple the second cylindrical portion 21 to the cylindrical portion 24. As a result, the rotation member 102 rotatably fixed to the first horizontal stand unit 11A1. When the horizontal driving unit 11 is united with the vertical driving unit 10 (that is, the camera body CA) such that the concave portion 100 fits in the convex portion 101, the camera body CA supported by the rotation member 102 is rotatable with respect to the horizontal stand 11A.

Figure 5A:
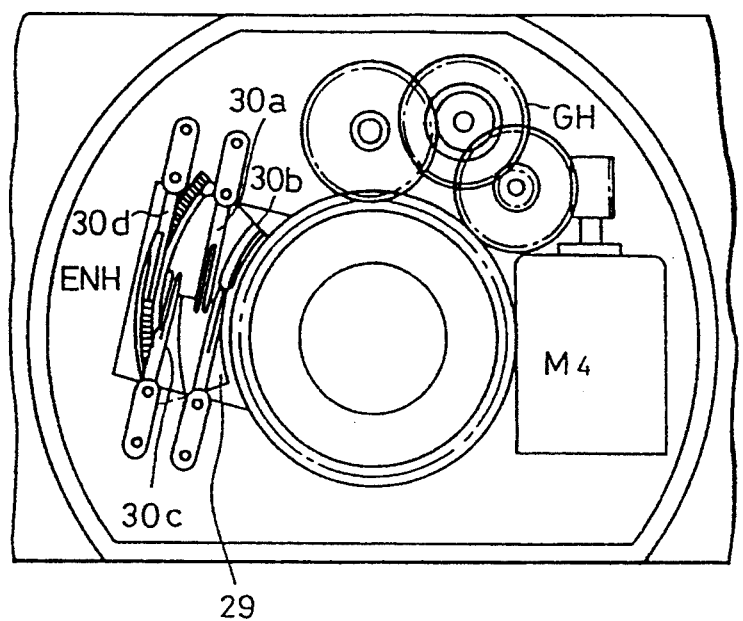
FIG. 5A and FIG. 5B are an enlarged plan view and a sectional view of a horizontal drive unit, respectively.
Figure 5B:
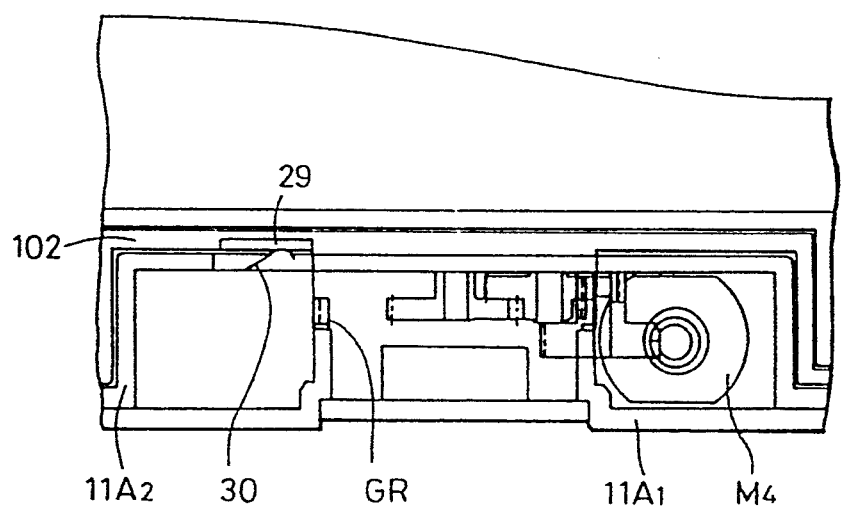

An encoder plate 29 of the encoder ENH is attached to the rotation member 102 as shown in FIG. 5 (B) and an armature 30 is fixed to the second horizontal stand 11A2. The relationship between the encoder plate 29 and the armature 30 is shown in FIG. 5 (A). Herein, the encoder plate 29 has various encoder patterns formed thereon which correspond to armatures 30a, 30b, 30c and 30d. The armature 30b is for grounding, while the armatures 30c, 30a and 30d output signals of SLR, SHREF and SHPUL, respectively, as shown in FIG. 10.

Figure 17A:
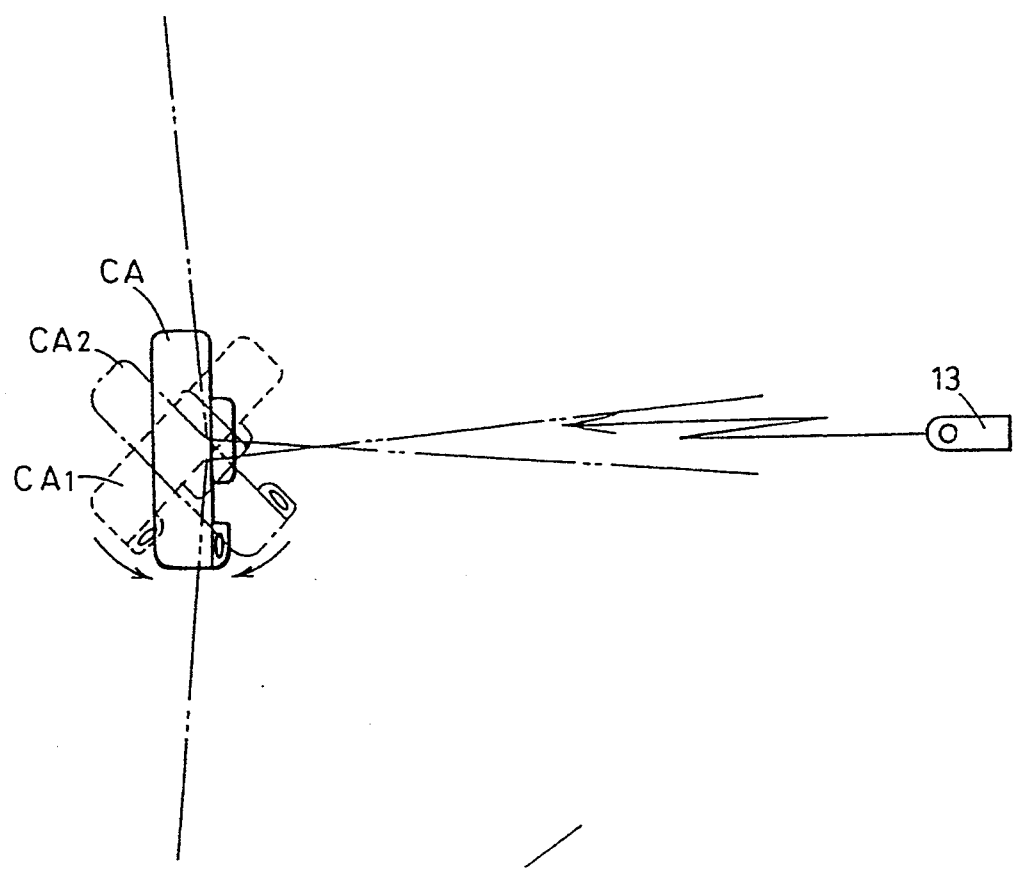
FIG. 17A and 17B is a diagram showing a remote controlled operation of the camera in response to a remote control signal.
Figure 17B:
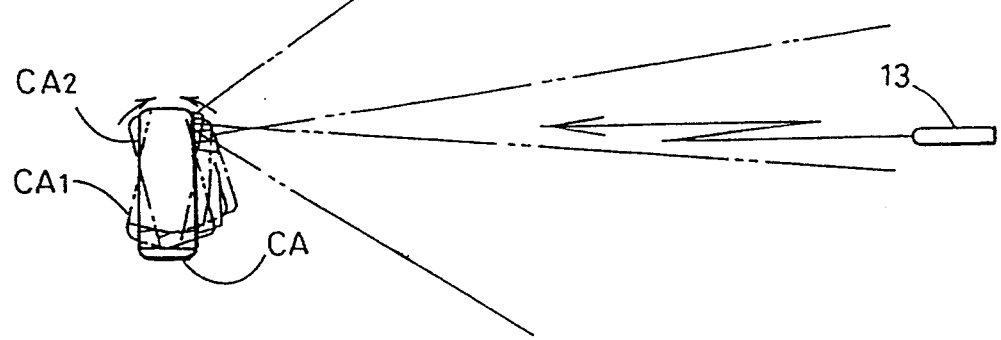

FIG. 17 (A) is a conceptual diagram showing the camera body CA being driven rightward and leftward by the remote control device 13 structured as described above and FIG. 17 (B) is a conceptual diagram showing the camera body CA swinging up and down, wherein the camera body CA indicated by the solid line moves as shown by a dotted line CA1 and a chain dotted line CA2.

Figure 9A:
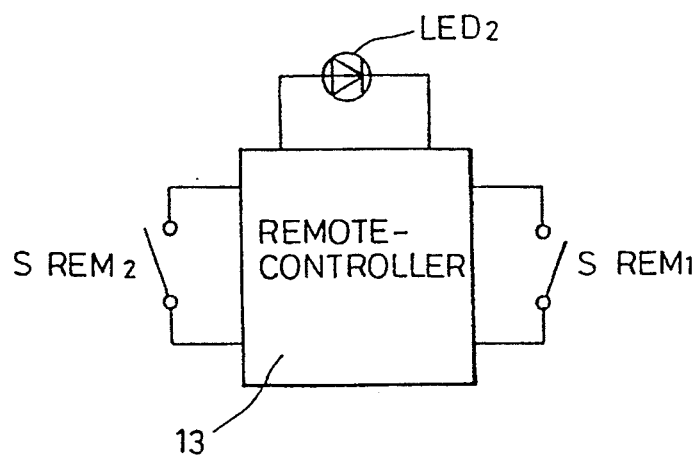
FIG. 9A, 9B, and 9C is a block circuit diagram of a camera system according to the present embodiment.
Figure 9C:
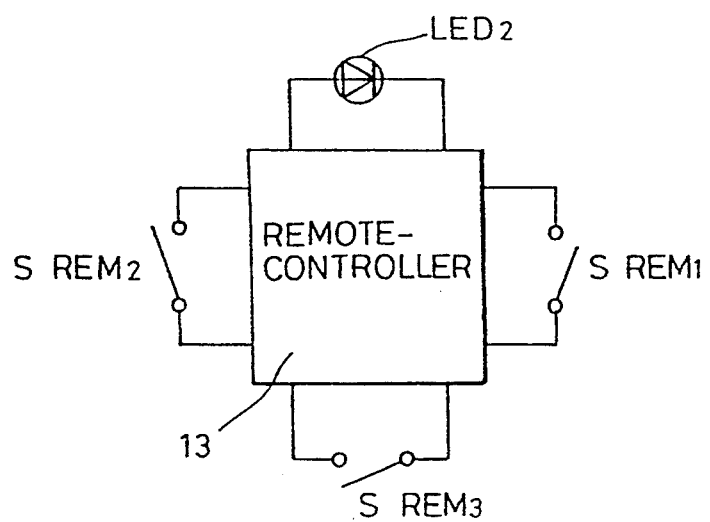
Figure 24:
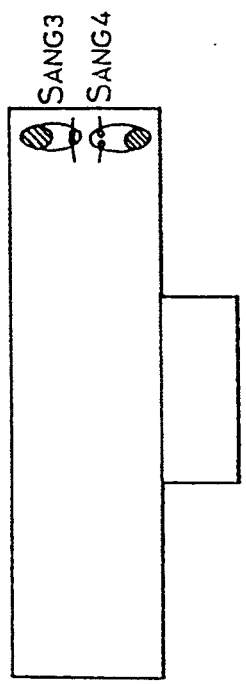
FIG. 24A, 24B, and 24C is a diagram showing an arrangement of an angle detection switch.
Figure 24:
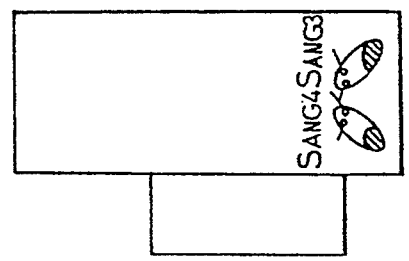
Figure 24:
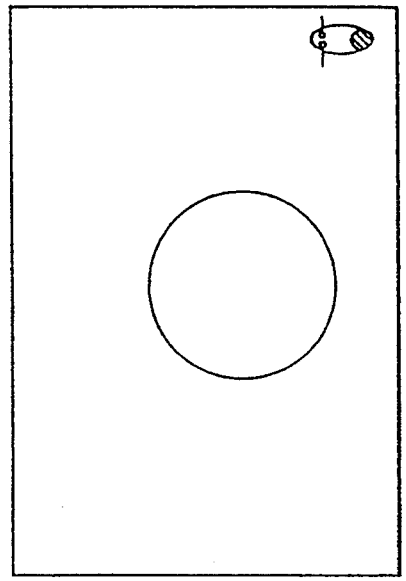

With reference to FIG. 9, a block circuit diagram of a camera system according to the present embodiment will be described. In the figure, a microcomputer $\mu C$ sequentially controls operations such as light measurement, distance measurement and film winding depending on a state of each switch. The following is a description of each switch. A main switch S0 is provided to allow and inhibit operation of the camera when it is turned on and off, respectively. A light/distance measuring switch S1 is turned on at a first stroke of the release button 2 shown in FIG. 1. A release switch S2 is turned on at a second stroke of the release button 2. A zoom-in switch SZI is turned on by moving the zoom lever 8 of FIG. 1 toward the rightward direction. A zoom-out switch SZO is turned on by moving the zoom lever 8 of FIG. 1 toward the leftward direction. A remote-control mode switch SRC is turned on by detaching the remote control device 13 from the camera body. Angle sensing switches SANG1–SANG4 comprising mercury switches are disposed in the camera body as shown in FIGS. 23 and 24. At least one of SANG1–SANG4 is turned on when the camera is inclined forward and backward and rightward and leftward by more than a predetermined angle from a normal standing state.

An attachment sensing switch SDR is turned on when the horizontal drive unit 11 is attached to the camera body CA. A vertical reference switch SVREF is turned on when the camera body CA faces a horizontal direction. An up-down determining switch SUD is turned on when the camera body CA faces downward and turned off when the same faces upward. SVPUL is a switch which is alternately turned on and off every time the direction of the camera body CA is moved upward or downward by 1°. These switches SVREF, SUD and SVPUL are incorporated into the above-described encoder ENV. A horizontal reference switch SHREF is turned on when the camera body CA takes an initial position (in the case of the present embodiment, the central position at which no gap exists between the camera body CA and the horizontal stand 11A in a horizontal direction). A right/left determining switch SLR is turned on when the camera body CA faces right and is turned off when the same faces left. SHPUL is a switch structured to alternately turn on and off every time the direction of the camera is moved rightward or leftward by 1°. These switches SHREF, SLR and SHPUL are incorporated into the above-described encoder ENH, a state of which switches is detected by the microcomputer $\mu C$ through the connector pin CODH and the connector COC. Signals generated from the respective switches SVREF, SUD, SVPUL, SHREF, SLR and SHPUL have such relations as shown in FIG. 10. No description will be made of zoom encoders ZEN0–ZEN4 related to zooming of the taking lens.

A light measurement/distance measurement block AF/AE measures light/distance in response to a signal from the microcomputer $\mu C$ and feeds a result thereof back to the microcomputer. A flash block FL emits light at a release when light measurement determines the necessity of flash. At this time, the flash block FL is controlled to boost by the microcomputer $\mu C$. A shutter block SB carries out lens driving for AF and shutter driving for exposure in response to a signal from the microcomputer μC.

A motor driver MDR1 for driving a zoom motor M1 performs control such as regular rotation, reverse rotation, breaking and OFF depending on "H" (logical high) and "L" (logical low) states of outputs (a combination of "H" and "L") MC1 and MC2 of the microcomputer μC. A motor driver MDR2 for driving a winding/rewinding motor M2 performs control similarly to the motor driver MDR1 depending on outputs MC3 and MC4 of the microcomputer μC. A motor driver MDR3 for driving a vertical driving motor M3 of the camera performs control similarly to the motor driver MDR1 depending on outputs MC5 and MC6 of the microcomputer μC. A motor driver MDR4 for driving a horizontal driving motor M4 of the camera performs control similarly to the motor driver MDR1 depending on outputs MC7 and MC8 of the microcomputer μC.

Figure 19A:
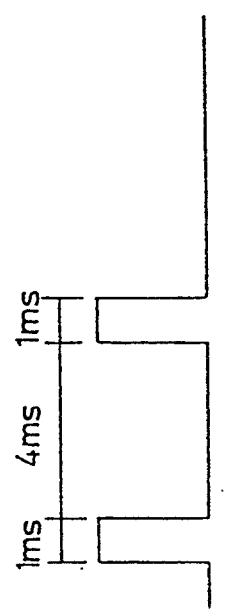
FIG. 19A and 19B is a diagram showing a transmission signal of a LED of a remote control device.
Figure 19B:
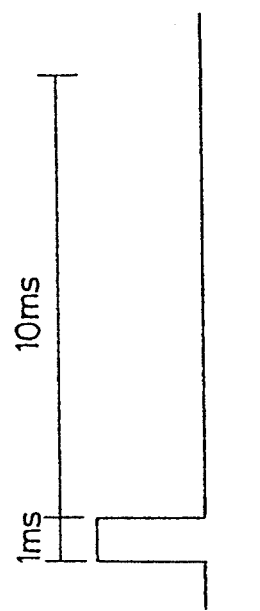

A light emission control block DSP controls light emission of a LED1 (the indicator LED12 of FIG. 1). Lighting/Turning-out of the LED1 is executed in such pattern as shown in A–E of FIG. 18 in response to a LD1 signal of the microcomputer μC. When a position sensor device PSD receives a remote control signal, a detection circuit DCT calculates a relative angle of an optical axis of the taking lens 7 to the position of the remote control device 13 at the time of the reception, in response to the signal from the position sensor device PSD and transmits angle data to the microcomputer μC. A LED2 of the remote control device 13 is an infrared ray LED for transmitting a remote control signal as an infrared light to the camera body, which LED is denoted by 16 in FIG. 2. Upon turning on a remote control switch SREM1 by pressing the remote control button 14 (FIG. 2) and turning on a remote control switch SREM2 by pressing the remote control button 15 (FIG. 2), the LED2 emits light in the patterns shown in FIG. 19 to transmit a remote release signal and a remote drive signal, respectively, to the camera body CA. LED 2 is lighted for 1 ms and again for 1 ms after a lapse of 4 ms as shown in FIG. 19 (a) by the remote release signal. LED 2 is lighted for 1 ms only at first and turned out for the subsequent 10 ms by the remote drive signal as shown in FIG. 19 (b).

The following is a description of communication between the detection circuit DCT and the microcomputer μC with reference to FIG. 11 (A). The detection circuit DCT and the microcomputer μC are connected to each other through four lines of SREQ, SCK, CS and SIN. When receiving a signal from the position sensor device PSD in response to a reception of a remote control signal, the detection circuit DCT first brings the potential on the line SREQ to a low level to request the microcomputer μC for transmission. The microcomputer μC brings the potential on the line CS to "L" upon detecting the low potential on the line SREQ. When acknowledging the potential on the line SREQ attaining a high level, the microcomputer μC transmits a clock signal (8 bits) for serial transmission. In synchronization with the signal, the detection circuit DCT transmits rightward and leftward angle data to the microcomputer μC. Thereafter, the microcomputer μC successively transmits a 8-bit clock signal again. The detection circuit DCT transmits upward and downward angle data to the microcomputer μC. Thereafter, the microcomputer μC brings the potential on CS to "H". Angle data is transmitted in a sequence as described above. The following is a description of the contents of said 8-bit data with reference to FIG. 11 (B). In a case of rightward and leftward data, 6 bits of b0–b5 represent information of an angle of a lens optical axis with respect to a position of the remote control device, the minimum of which is 1°. b6 is not used, while b7 represents information on whether the remote control device 13 is positioned at rightward or leftward with respect to the lens optical axis. When the remote control device 13 is positioned at 45° rightward with respect to the camera body CA, for example, right and left data is represented as 0*101101 (*=Don't Care). It is also the case with up-down data. The time required for this communication is sufficiently shorter than an interval 4 ms of lighting of the above-described LED 2 in response to a remote release signal.

Operation of the present embodiment will be described with reference to flow charts shown in FIGS. 12–16.

Figure 12:
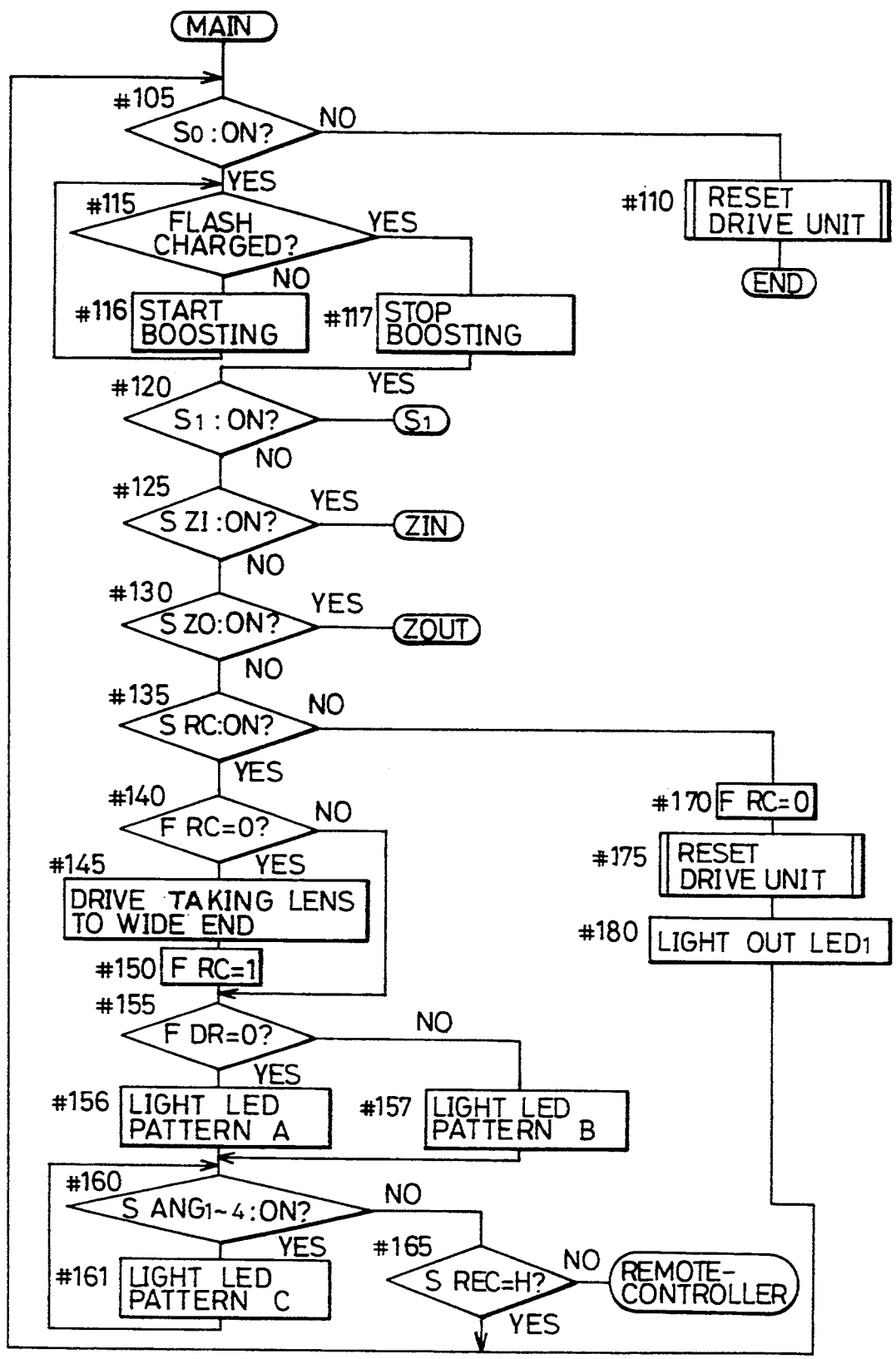
FIG. 12 is a flow chart of a main routine for control.

FIG. 12 is a flow chart of a main routine. First in step #105, determination is made as to whether the main switch S0 of the camera body CA is turned on or not. When it is off, the program proceeds to step #110 where the drive unit is reset. Resetting of the drive unit means returning the drive unit of the camera body CA, when not in an initial state, to the initial position. That is, resetting is an operation of returning the drive unit to a position where there exists neither a gap between the camera body CA and the horizontal stand 11A (which will be referred to as "facing front" hereinafter) and a gap between the camera body CA and the vertical stand 10A (which will be referred to as "facing a horizontal direction" hereinafter). The processing is completed thereafter. If the main switch S0 is on in step #105, determination is made in step #115 whether charging of a capacitor for light emission in the flash block FL is completed or not. If it is not completed, boosting is started in step #116 to wait for a completion of charging in step #115. Upon the completion of charging, the boosting is stopped in step #117 to proceed to step #120.

Determination is made in step #120 whether the light measurement/distance measurement switch S1 is turned on or off. If it is on, the program proceeds to a S1 routine which will be described below. When the switch S1 is off, the program proceeds to step #125 where determination is made as to whether the zoom-in switch SZI is on or not. If it is on, the program proceeds to a ZIN routine, while if it is off, the program proceeds to #130. Determination is made in step #130 whether the zoom-out switch SZO is on or not. When it is on, the program proceeds to a ZOUT routine. When it is off, the program proceeds to step #135 where determination is made whether the remote control mode switch SRC indicates a remote-controlled photographing mode or not. If SRC is off and not indicating the remote controlled photographing mode, that is, when in a normal photographing mode wherein the remote control device 13 is attached to the camera body CA, a remote control mode flag FRC is set to 0 in step #170 and the drive unit is reset in step #175. After lighting out the LED1 in step #180, the program returns to step #105. The remote control mode flag FRC is for storing photographing modes and is set to 0 for a normal photographing mode and to 1 for a remote-controlled photographing mode.

When the remote control mode switches SRC is on in step #135, that is, in a remote-controlled photographing mode, determination is made of the remote control mode flag FRC in step #140. When FRC=0, meaning that the normal photographing mode is switched to a remote-controlled photographing mode, the taking lens 7 is driven to a wide end to have the shortest focal length in step #145 and the remote control mode flag FRC is set to 1 in step #150. When FRC=1 in step #140, the remote-controlled photographing mode continuous and the processings in steps #145 and #150 have been already done, so that processings will not be repeated.

The determination is made of the remote control drive end flag FDR in step #155. FDR is a flag for storing information on whether remote controlled drive is carried out or not, to which flag "1" is set when the drive is performed and the flag is used for determining as to whether distance measurement should be carried out or not at the time of remote control release. The camera system of the present embodiment, controlled to perform distance measurement at the completion of the remote controlled drive, necessitates no operation of distance measurement at the time of remote release after remote controlled drive is done. When FDR=0 in step #155 and no remote controlled drive is performed, the LED1 is lighted according to the pattern A of FIG. 18 in step #156. When FDR=1 and the remote controlled drive is performed, the LED1 is lighted according to the pattern B of FIG. 18 in step #157. Both of the patterns A and B indicate that the camera is in remote control signal stand-by state after and before remote-control drive is performed, respectively in a remote-controlled photographing mode. Then in step #160, the determination is made as to whether the angle sensing switches SANG1-SANG4 are turned on/off. When at least one of the SANG0-SANG4 is on, that is, when the camera is inclined at more than a predetermined angle, the LED1 is lighted according to the pattern C of FIG. 18 to give warning in step #161 and then the program returns to step #160. The warning pattern C emits light at a short interval as shown in FIG. 18. When the camera is not inclined in step #160, determination is made of the state of the line SREQ in step #165. If it is "H", the program returns to step #105. If the line SREQ is at "L", that is, when the remote control signal (a remote release signal or a remote drive signal) is received, the program proceeds to the remote control routine.

Figure 13:
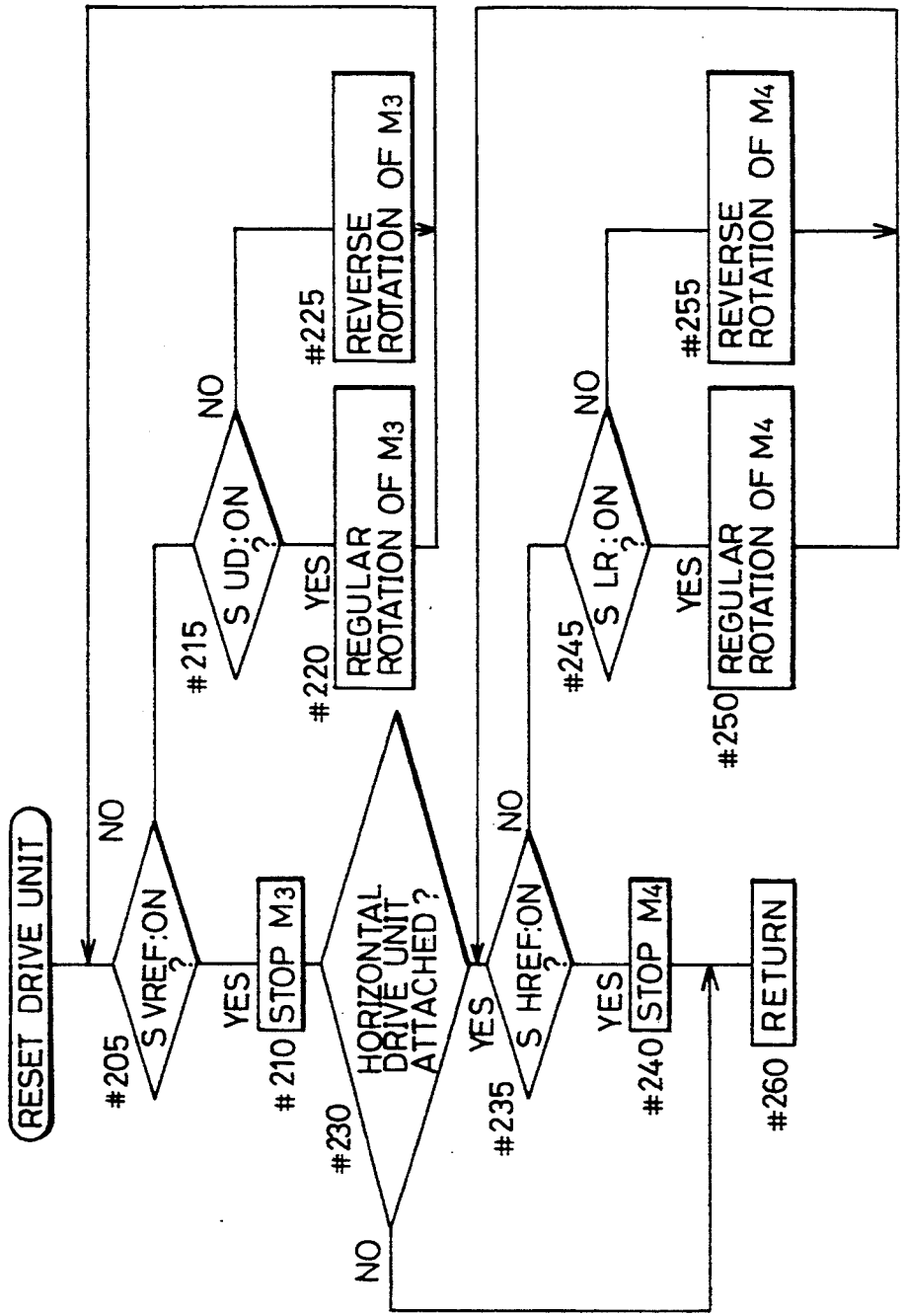
FIG. 13 is a flow chart of a drive unit reset routine.

FIG. 13 is a flow chart of reset routine for resetting the drive unit to the initial position. With reference to FIG. 13, on/off state of the vertical reference switch SVREF determines whether the camera body CA faces a horizontal plane or not in step #205. When SVREF is off, that is when the camera does not face the horizontal plane, the program proceeds to step #215. On/off state of the up-down determination switch SUD determines whether the camera body CA faces upward or downward, on which determination a rotation direction of the vertical drive motor M3 is for regularly rotated or reversely rotated (step #220 and #225). Then, returning to step #205, the following operation will be repeated. When the camera body CA faces a horizontal plane to turn on the vertical reference switch SVREF, the program proceeds from step #205 to step #210 wherein the vertical driving motor M3 is stopped. Then, if the horizontal drive unit 11 is not attached in step #230, the program returns to the main routine (step #260). If it is attached, the program proceeds to step #235 to perform initial position resetting for horizontal drive. This operation is the same as that of the above-described vertical drive. In other words, the determination is made in step #235 based on on/off of the horizontal reference switch SHREF as to whether the camera body CA faces front or not. If SHREF is off and the camera does not face front, the program proceeds to step #245 wherein the determination is made based on on/off of the right/left determination switch SLR as to whether the camera body CA faces rightward or leftward. Based on the determination, the horizontal driving motor M4 is regularly rotated or reversely rotated (steps #250 and #255). Thereafter, the program returns to step #235 to repeat the same operation. When the camera body CA faces front to turn on the horizontal reference switch SHREF, the program proceeds to step #240 to stop the horizontal driving motor M4 and then returns to the main routine at step #260.

With reference to FIG. 14, a flow chart of zoom lens drive will be described. The flow is executed by operating the zoom lever 8 to turn on the zoom-in switch SZI or the zoom-out switch SZO. FIG. 14 (A) is a flow chart of the ZIN routine in a case where the zoom-in switch SZI is turned on. First in step #305, the determination is made whether the zoom-in switch SZI is still on or not. If it is still on, determination is made in step #310 whether the zoom lens of the taking lens 7 reaches the tele end, that is, whether the zoom lens reaches a position at which the maximum focal length can be obtained. If the lens does not reach the tele end, the program proceeds to step #315 to rotate the zoom motor M2 regularly in order to drive the lens toward the tele direction. Then returning to step #305, the foregoing operation will be repeated. When the zoom-in switch SZI is turned off in step #305 or when the determination is made that the lens reaches the tele end in step #310, the program proceeds to step #320 to stop the zoom motor M2 and returns to the main routine of FIG. 12. FIG. 14 (B) is a flow chart of the ZOUT routine in a case where the zoom-out switch SZO is turned on, operation of which flow is the same as that in zoom-in.

Figure 15:
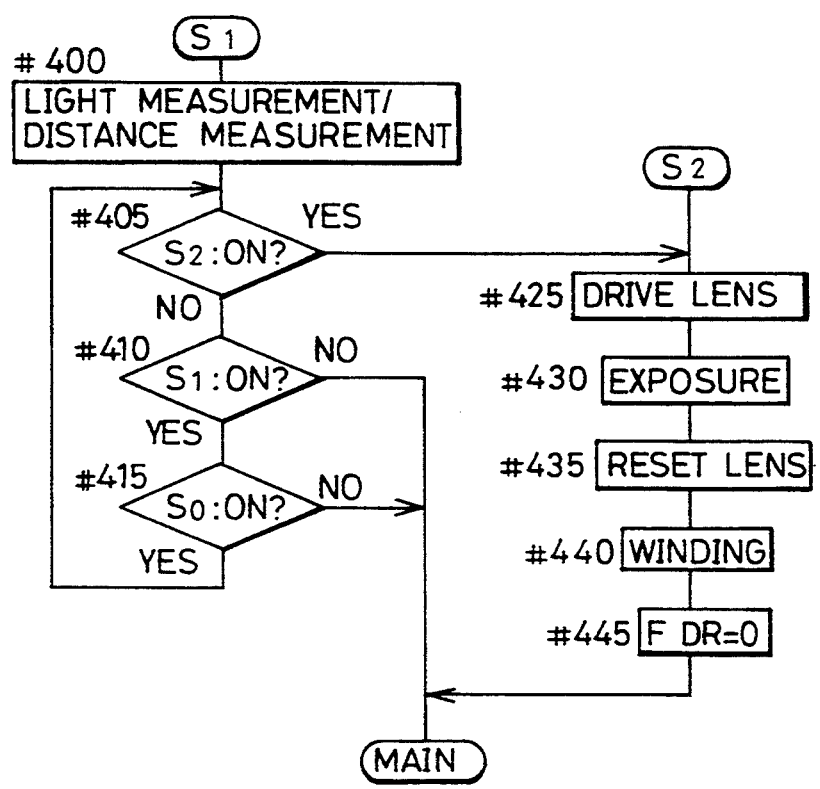
FIG. 15 is a flow chart of light measurement/focus detection and releasing.

With reference to FIG. 15, a flow chart of light measurement/distance measurement and releasing will be described. When the determination is made in the main routine that the switch S1 is turned on, the program enters the S1 routine, wherein the light measurement/distance measurement block AF/AE performs light measurement/distance measurement in step #400. Then in step #405, determination is made whether the release switch S2 is on or off. If it is off, the program proceeds to step #410 to determine whether light measurement/distance measurement switch S1 is on or off. If S1 is on, the program proceeds to step #415, and if it is off, the program returns to the main routine. In step #415, determination is made whether the main switch S0 is on or off. If it is on, the program returns to step #405 to repeat the foregoing operation. If it is off, the program returns to the main routine. When the determination is made in step #405 that the release switch S2 is on, the program proceeds to step #425 to perform lens drive for AF, which is followed by a series of release operation sequence of exposure (#430), lens resetting (#435) and film winding-up. After setting the remote drive end flag FDR to 0 in step #445, the program returns to the main routine. In the figure, the flow from step #425 and thereafter branches out of the remote control routine of FIG. 16 as S2, which will be described later.

Figure 16A:
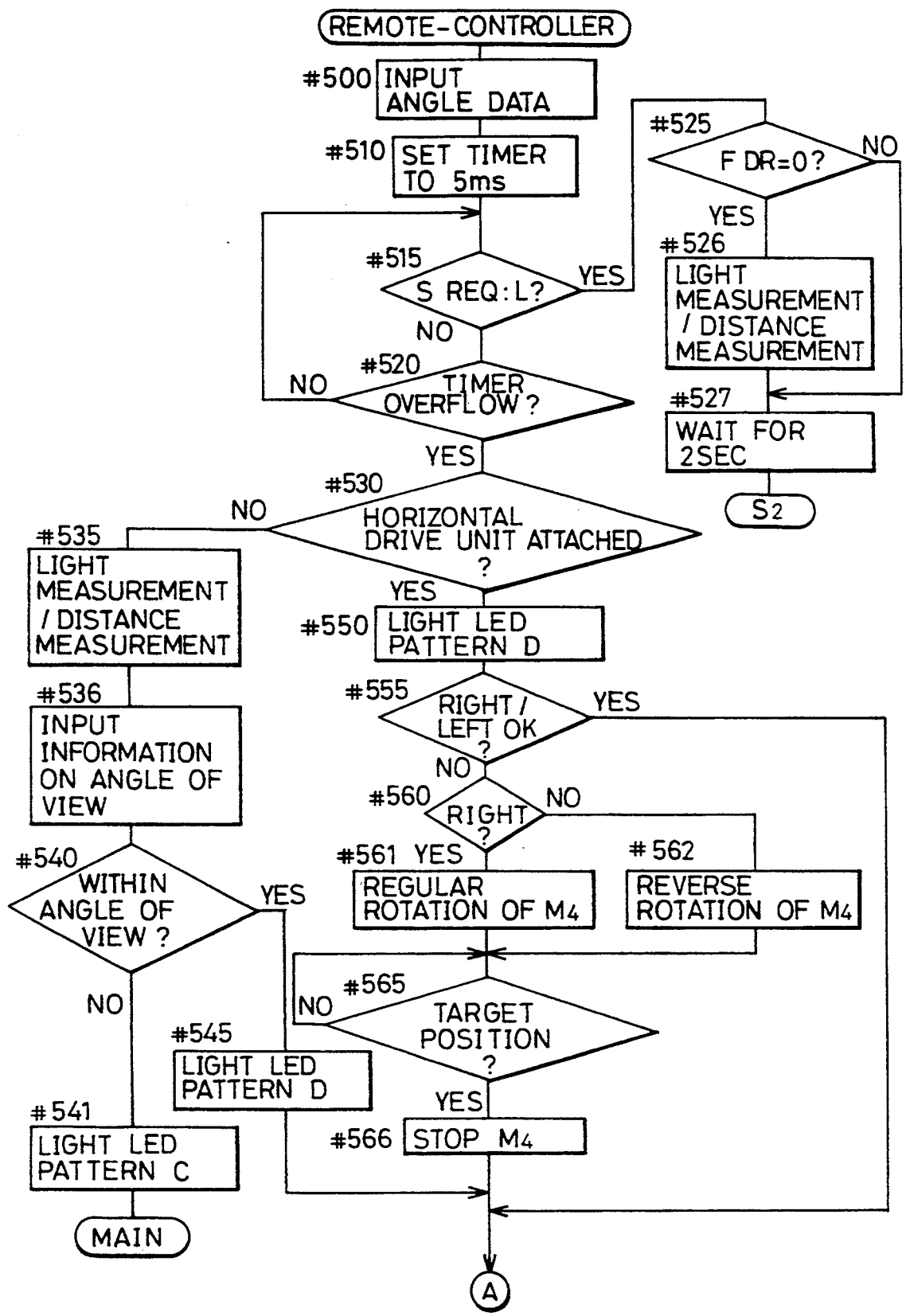
FIG. 16A and 16B is a flow chart of a remote control routine.
Figure 16:
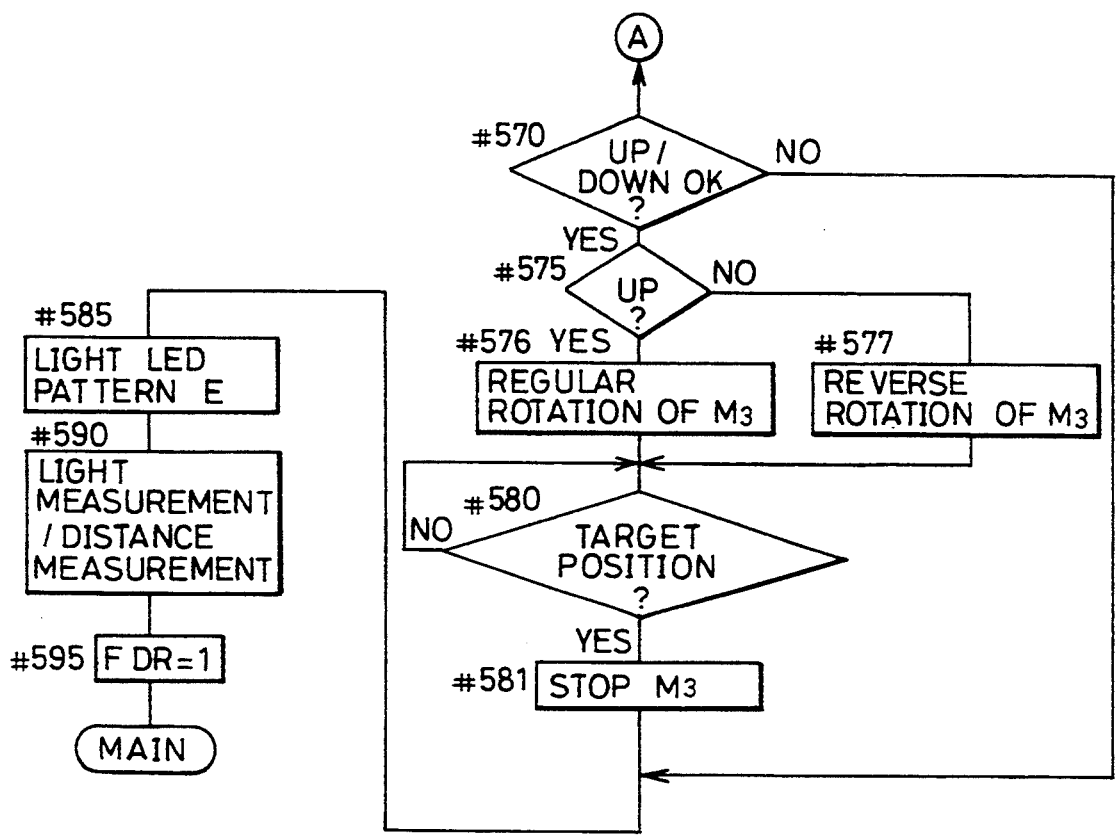

With reference to FIG. 16, a flow chart of the remote control routine at the time of remote-controlled photographing will be described. In the remote-controlled photographing mode, the detection circuit DCT receives infrared light from the remote control device 13 to bring the potential on the line SREQ to "L", whereby the program proceeds from step #165 of the main routine of FIG. 12 to the remote control routine of FIG. 16. First in step #500, data of an angle of the optical axis of the camera with respect to the remote control device 13 is input from the detection circuit DCT based on such system as shown in FIG. 11. Then, after setting the timer to 5 ms in step #510, the program proceeds to steps #515 and #520 to wait for the potential on the line SREQ attaining "L" or overflow of the timer. When the potential on SREQ attains "L" prior to the overflow of the timer, that is, when the detection circuit DCT again request another transmission within 5 ms after the end of transmission, a received signal is regarded as a remote release signal to proceed to step #525. The remote release signal transmitted by pressing the operation button 14 of the remote control device 13 can be received only at this step, which signal is disregarded during remote controlled drive which will be described later. In step #525, determination is made of the remote drive end flag FDR. When FDR=0 where no remote controlled drive is carried out, neither light measurement nor distance measurement related thereto is performed. Therefore, in step #526 light measurement/distance measurement is performed, which is not performed when FDR=1. After waiting for two seconds in step #527, the S2 routine, that is, the step #425 and thereafter of FIG. 15 are executed for a series of release sequence. When overflow of the timer is detected in step #520, that is, when no transmission request is received from the detection circuit DCT within 5 ms, the received signal is regarded as a remote drive signal to proceed to step #530 wherein remote controlled drive of the camera, which will be described in the following, is performed.

In step #530, determination is made whether the horizontal drive unit 11 is attached to the camera body. When it is attached, the program proceeds to step #550 to cause the LED1 to light according to the pattern D of FIG. 18 in order to inform the user of the remote controller of a remote controlled drive start. In step #555, determination is made as to whether the camera body should be rotated rightward or leftward. If it should not be, the program proceeds to step #570. When it should, the program proceeds to step #560 to determine whether the rotation direction is right or left. Based on the determination, the horizontal driving motor M4 is rotated regularly or reversely (step #561 and step #562). Then in step #565, the number of obtained pulses as shown in FIG. 10 is checked by the switch SHPUL to determine whether the motor has been rotated by up to a target angle. If not, the checking operation will be repeated to wait for the motor to be rotated by up to the target angle. The motor M4 is stopped in step #566 when the motor has been rotated to the target position, whereby the program proceeds to step #570. When the determination is made in step #530 that the horizontal drive unit 11 is not attached to the camera body CA, light measurement/distance measurement is carried out in step #535, which is followed by obtaining information on photographing angle of view from the focal length of the taking lens in step #536. In step #540, the information is compared with the angle data obtained in step #500 to determine whether the object operating the remote control device 13 falls within the photographing angle of view. When it does not fall, the LED1 is lighted according to the pattern C of FIG. 18 in order to indicate warning in step #541 and the program returns to the main routine. If the object falls within the angle of view in step #540, the LED1 is lighted according to the pattern D of FIG. 18 in step #545 to indicate that remote controlled drive is started or it is in operation and the program proceeds to step #570. Steps #570–581 are for driving the camera body CA upward or downward, operations of which are the same as those of the above-described steps #555–#566. The foregoing operation results in the camera body CA facing the direction of the remote control device. Thereafter, the LED1 is lighted according to the pattern E of FIG. 18 in step #585 to indicate the end of the remote controlled drive. Light measurement/distance measurement after the end of remote controlled drive is carried out in step #590, and the program returns to the main routine after setting the remote drive end flag FDR to 1 in step #595.

Although in the present embodiment, the drive unit is reset (steps #110 and #175 of the main routine of FIG. 12) after turning off of the main switch S0 and the attachment of the remote control device 13, resetting of the drive unit can be done prior or after film rewinding or after a lapse of a predetermined time after the release. It is also possible to use an additional remote control signal, which is used for instructing random resetting of the drive unit.

Figure 9B:
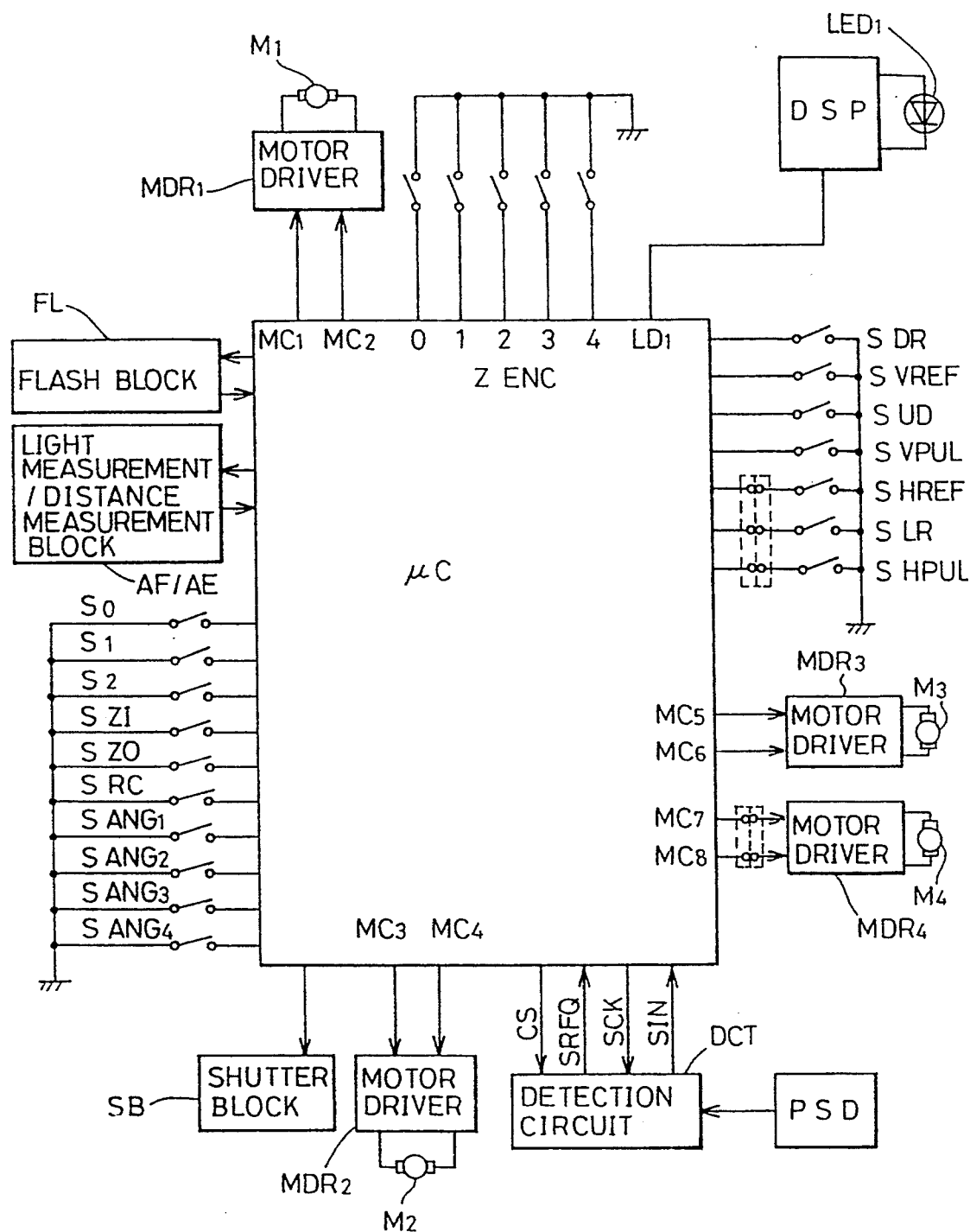

In such a case, resetting a drive unit requires an user of the remote control device to operate a remote control button (corresponding to SREM3 of FIG. 9(B), which is a modification of the remote control device 13 of FIG. 9(A)) for resetting. This enables control that the user needs.

Figure 20:
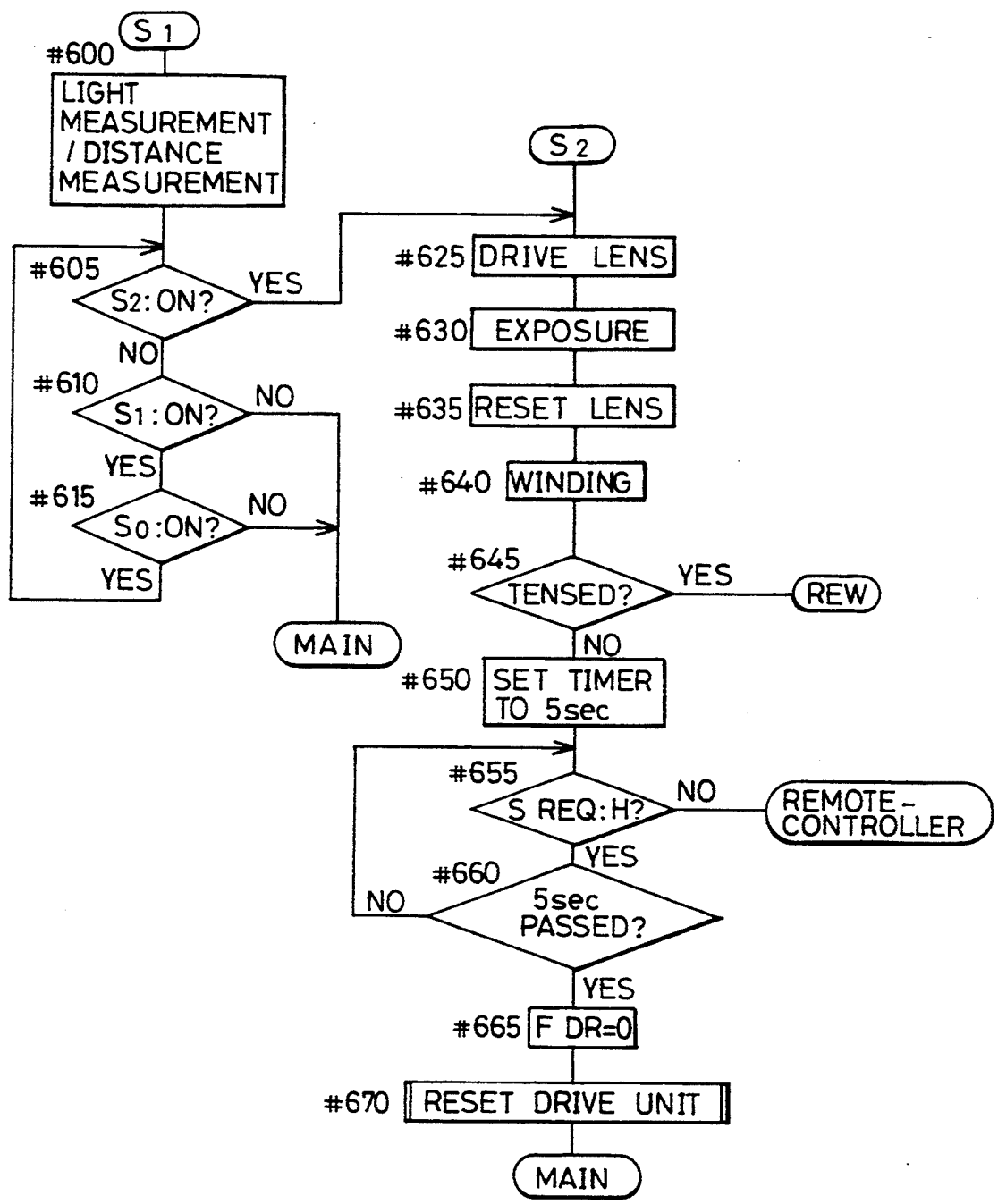
FIG. 20 is a flow chart of light measurement/focus detection and releasing according to another embodiment of the present invention.
Figure 21:
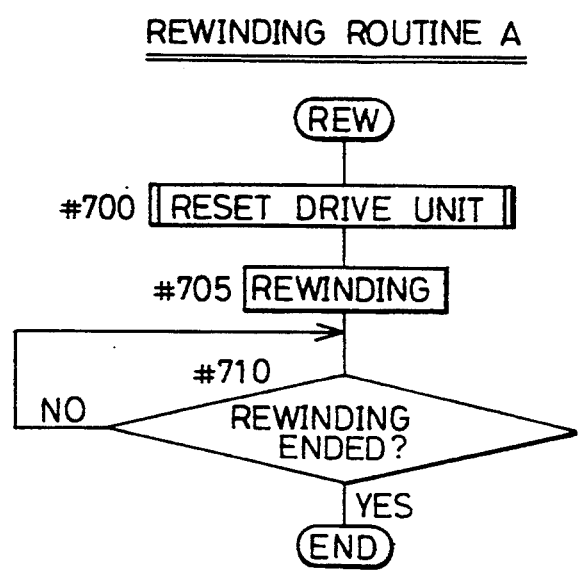
FIG. 21 is a flow chart of a rewinding routine A.
Figure 22:
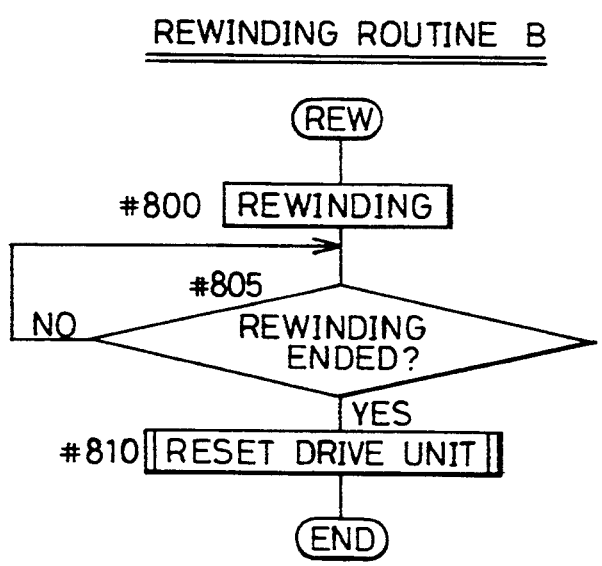
FIG. 22 is a flow chart of a rewinding routine B.

With reference to FIGS. 20 to 22, description will be made of a flow chart for resetting the drive unit after a lapse of a predetermined time after the releasing and prior to or after the film rewinding. FIG. 20 shows a modification of the flow chart of light measurement/distance measurement and releasing shown in FIG. 15. For resetting in such timing, the program branches from the main routine to FIG. 20.

In FIG. 20, the operations in steps up to step #640 for film winding-up are the same as those of FIG. 15, description of which will be omitted. Thereafter, it is determined in step #645 whether the film is wound up to the last frame (in this embodiment, that is deteted in a tension state). If so, the program proceeds to the rewinding routine REW. If not, the timer is set to 5 seconds in step #650. In step #655, determination is made whether the line SREQ is at "L" or "H". If the line SREQ is at "L", that is, if a remote control signal (remote release signal or remote drive signal) is received, the program proceeds to the remote control routine, and when the line is at "H", the program proceeds to step #660 to see if 5 seconds have passed. If 5 seconds have not passed, the program returns to step #665, and if they have passed, the remote drive end flag FDR is set to 0 in step #665 and the drive unit reset routine is carried out, whereby the program returns to the main routine. Herein, it is assumed that the drive unit is reset after a lapse of 5 seconds after a series of release operations in steps #625 to #640.

The above-described rewinding routine REW are carried out in two manners. FIG. 21 shows a flow chart of resetting the drive unit prior to rewinding of the film and FIG. 22 is a flow chart of resetting the drive unit after rewinding of the film.

While the present embodiment employs a LED as a means for indicating various information at the time of a remote control operation, audio generating means or the like can be used for indication.

As described in the foregoing, according to the present invention a remote controlled camera system is provided wherein an automatic initializing operation (resetting) for returning, to an initial position, optical axis of a taking lens of the camera which is set at a position at angles upward, downward, rightward and leftward from the initial position is performed in preferred timing without requiring the user's operation. It is therefore not necessary for the user to take resetting of the drive unit into consideration, which results in improving operability.

Resetting of the drive unit for returning the optical axis of the taking lens of the camera to the initial position, can be easily implemented by adding process steps thereof to the existing control program.

Since the above described resetting operation is not performed in a fixed time after photographing is carried out with a camera body faced to the remote control device, the users are allowed to continuously photograph a plurality of times in that state.

Furthermore, since the camera, when the optical axis of the lens is in driving operation, does not accept a remote release signal even if the user located away from the camera body presses a release button of the remote control device by mistake, no exposure is performed. Therefore, such erroneous operation as unintentional photographing can be avoided, resulting in increasing operability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote controlled camera system including a camera body and a remote control device emitting to said camera body a signal for rotating an optical axis of a taking lens provided at the camera body upward and downward or rightward and leftward, said camera body comprising:
   rotation driving means, responsive to the signal from said remote control device, for rotating the optical axis of the taking lens,
   means for switching a mode of said camera body between a first mode wherein photographing operation is performed without using said remote control device and a second mode wherein photographing operation is performed in response to the signal from said remote control device, and
   means, responsive to said switching means switching the mode from the second mode to the first mode for controlling said rotation driving means so as to set the optical axis of the taking lens to a predetermined position.

2. A remote controlled camera system according to claim 1, wherein the predetermined position of the optical axis is an initial position in a vertical direction.

3. A remote controlled camera system according to claim 1, wherein the predetermined position of the optical axis is an initial position in a horizontal direction.

4. A remote controlled camera system according to claim 1, wherein said controlling means controls said rotation driving means in response to a switching of said switching means to the first mode from the second mode.

5. A remote controlled camera system according to claim 1, wherein said remote control device is detachably attached to said camera body and said switching means switches the mode of said camera body to the second mode when said remote control device is detached from said camera body.

6. A remote controlled camera system including a camera body and a remote control device emitting to said camera body a signal for rotating an optical axis of a taking lens provided at the camera body upward and downward or rightward and leftward, said camera body comprising:
   rotation driving means, responsive to the signal from said remote control device, for rotating the optical axis of the taking lens,
   release means for performing a release operation,
   timer means for counting a specified time after the release operation of said release means is completed at a position where the release operation is performed, and
   means, responsive to said timer means, for controlling said rotation driving means so as to reset the optical axis of the taking lens to an initial position after the specified time elapses.

7. A remote controlled camera system according to claim 6, wherein said timer means starts to count the specified time after an exposed photographic frame of the film is wound up in the release operation.

8. A remote controlled camera system according to claim 6, wherein said camera body further comprises means for allowing said rotation driving means to rotate the optical axis in response to the signal from said remote control device while said timer means counts the specified time.

9. A remote controlled camera system according to claim 8, wherein said remote control device further emits a release signal for activating the release operation of said release means and said allowing means further allows said release means to perform the release operation in response to the release signal from said remote control device while said timer means counts the specified time.

10. A remote controlled camera system including a camera body and a remote control device emitting to said camera body a signal for rotating an optical axis of a taking lens provided at the camera body upward and downward or rightward and leftward, said camera body comprising:
   rotation driving means, responsive to the signal from said remote control device, for rotating the optical axis of the taking lens,
   means for detecting a state that a photographing operation of the last photographic frame of a film loaded in said camera body is completed, and
   means, responsive to said detecting means, for controlling said rotation driving means so as to set the optical axis of the taking lens to a predetermined position while maintaining a present position when the completion is not detected.

11. A remote controlled camera system including a camera body and a remote control device emitting to said camera body a signal for rotating an optical axis of a taking lens provided at the camera body upward and downward or rightward and leftward, said camera body comprising:

rotation driving means, responsive to the signal from said remote control device, for rotating the optical axis of the taking lens, means for feeding a photographic frame of a film loaded in said camera body at every photographing operation, means for rewinding the film, and means, responsive to said rewinding means, for controlling said rotation driving means so as to set the optical axis of the taking lens to a predetermined position when a film rewinding operation of said rewinding means is started.

12. A remote controlled camera system according to claim 11, wherein said controlling means controls said rotation driving means after the film rewinding operation of said rewinding means is completed.

13. A remote controlled camera system according to claim 11, wherein said camera body further comprises means for detecting a state where a photographing operation of the last photographic frame of the loaded film is completed and said rewinding means starts rewinding operation in response to said detection.

14. A remote controlled camera system including a camera body and a remote control device emitting to said camera body a signal for rotating an optical axis of a taking lens provided at the camera body upward and downward or rightward and leftward, said camera body comprising:

rotation driving means, responsive to the signal from said remote control device, for rotating the optical axis of the taking lens, means for feeding a photographic frame of a film loaded in said camera body at every photographing operation, means for rewinding the film, and means responsive to said rewinding means, for controlling said rotation driving means so as to set the optical axis of the taking lens to a predetermined position before a film rewinding operation of said rewinding means is started.

15. A remote controlled camera system including a camera body capable of recording an image of an object in a recording means loaded in said camera body and a remote control device emitting to said camera body a signal for rotating an optical axis of a taking lens provided at the camera body upward and downward or rightward and leftward, said camera body comprising:

rotation driving means, responsive to the signal from said remote control device, for rotating the optical axis of the taking lens, means for detecting a state where capacity of the recording means is not available for another photographing operation, and means responsive to said detecting means for controlling said rotation driving means so as to set the optical axis of the taking lens to a predetermined position when said detecting means detects said state.

16. A remote controlled camera system according to claim 15, wherein the recording means is a film.

17. A remote controlled camera system including a camera body and a remote control device emitting to said camera body a first signal light for rotating an optical axis of a taking lens provided at the camera body upward and downward or rightward and leftward and a second signal light for activating said camera body to perform a release operation, said camera body comprising:

rotation driving means, responsive to the first signal from said remote control device, for rotating the optical axis of the taking lens, release means responsive to the second signal for performing the release operation, and means for inhibiting said release means from performing the release operation in response to the second signal when said rotation driving means is in operation.

18. A remote controlled camera system including a camera body and a remote control device emitting to said camera body a first signal for rotating an optical axis of a taking lens provided at the camera body upward and downward or rightward and leftward and a second signal for activating a release operation of said camera body, said camera body comprising:

rotation driving means, responsive to the first signal from said remote control device, for rotating the optical axis of the taking lens, release means, responsive to the second signal, for performing the release operation, means for measuring an object distance to an object to be photographed, and means for switching a mode of said camera body between a first mode wherein said release means performs the release operation with the measuring operation of said measuring means in response to the second signal and a second mode wherein said release means performs the release operation without the measuring operation of said measuring means in response to the second signal.

19. A remote controlled camera system according to claim 18, wherein said camera body further comprises means for controlling said switching means to switch the mode of said camera body to the second mode when said rotation driving means rotates the optical axis in response to the first signal.

20. A remote controlled camera system according to claim 18, wherein said camera body further comprises means for controlling said switching means to switch the mode of said camera body to the first mode when the release operation of said release means responsive to the second signal is completed.

21. A remote controlled camera system according to claim 20, wherein said camera body further comprises timer means for counting a specified time after the release operation of said release means is completed and said controlling means controls said switching means after the specified time elapses.

* * * * *